US008443305B2

(12) United States Patent  (10) Patent No.: US 8,443,305 B2
Millman  (45) Date of Patent: May 14, 2013

(54) CHART ANALYSIS INSTRUMENT

(75) Inventor: Deron J Millman, North Canton, OH (US)

(73) Assignee: Millman Technologies, LLC, Hudson, OH (US)

( * ) Notice: Subject to any disclaimer, the term of this patent is extended or adjusted under 35 U.S.C. 154(b) by 208 days.

(21) Appl. No.: 12/889,498

(22) Filed: Sep. 24, 2010

(65) Prior Publication Data

US 2011/0016420 A1  Jan. 20, 2011

Related U.S. Application Data

(60) Provisional application No. 61/320,465, filed on Apr. 2, 2010.

(51) Int. Cl.
*G09B 7/04* (2006.01)

(52) U.S. Cl.
USPC .................. 715/961; 715/712; 715/964

(58) Field of Classification Search .................. None
See application file for complete search history.

(56) References Cited

U.S. PATENT DOCUMENTS

| | | | | |
|---|---|---|---|---|
| 7,054,741 B2* | 5/2006 | Harrison et al. | ............... | 701/522 |
| 7,312,802 B2* | 12/2007 | Komornicki et al. | ......... | 345/619 |
| 7,356,406 B2* | 4/2008 | Harrison et al. | ............... | 701/532 |
| 7,376,516 B2* | 5/2008 | Jones | ............................. | 702/14 |
| 7,558,676 B2* | 7/2009 | Jones | ............................. | 702/14 |
| 7,558,677 B2* | 7/2009 | Jones | ............................. | 702/14 |
| 7,580,045 B2* | 8/2009 | Harrison et al. | ............... | 345/628 |
| 2007/0106647 A1* | 5/2007 | Schwalb | .......................... | 707/3 |

* cited by examiner

*Primary Examiner* — Ramsey Refai
*Assistant Examiner* — William Titcomb
(74) *Attorney, Agent, or Firm* — Christopher L. Parmelee; Walker & Jocke

(57) ABSTRACT

A geometric instrument for analyzing curves and charts is described herein. The instrument is utilizable to facilitate review of land surveys, including ALTA surveys, title surveys, boundary surveys, topographical surveys, etc. The instrument allows users thereof to quickly and thoroughly review land surveys and data relating thereto, for instance, for title insurance purposes.

17 Claims, 28 Drawing Sheets

FIG. 10

| SECTION | TASK | REVIEWED | COMMENTS |
|---|---|---|---|
| SCHEDULE A | REVIEW SCHEDULE A | ☒ | REVIEWED AND APPROVED BOUNDARY. NEED TO REQUEST |
| SCHEDULE B | REVIEW SCHEDULE B | ☒ | SAME AS SURVEY |
| ENCROACHMENTS | REVIEW ENCROACHMENTS | ☐ | VERIFY THAT THE TITLE COMPANY CAN PROVIDE |
| PARKING | REVIEW PARKING | ☒ | INFORMATION COVERAGE FOR |
| ZONING | REVIEW ZONING | ☐ | NEED FORCED REMOVAL. |
| FLOOD ZONE | REVIEW FLOOD ZONE | ☐ | |
| BASIS OF BEARING | REVIEW BASIS OF BEARING | ☐ | |

FIG. 28

CHART ANALYSIS INSTRUMENT

RELATED APPLICATION

This application claims the benefit of U.S. Provisional Patent Application Ser. No. 61/320,465, entitled "CHART ANALYSIS INSTRUMENT", and filed on Apr. 2, 2010, the entirety of which is incorporated herein by reference.

TECHNICAL FIELD

This invention is a geometric instrument that is utilized for curve and chart analysis, and is desirably classified in class 33, subclass 1C.

BACKGROUND

Land surveying pertains to the identification of terrestrial points and distances and angles in between. There are many different types of land survey, with types of points identified being different across the different types of land surveys. A boundary survey is generally prepared to identify to an interested party boundary lines of a particular parcel or collection of parcels. A surveyor prepares the survey by first researching the parcel(s), including analyzing any pre-existing surveys of the parcel(s) and/or parcels relatively proximate thereto, analyzing existing plats that include the parcel(s), analyzing a legal description of the parcel(s) as found in a deed, amongst other records. Oftentimes, paperwork utilized by the surveyor to prepare the survey is located in different offices (sometimes in separate buildings). For example, existing surveys are often located in county offices referred to as "Tax Map Offices", while legal descriptions and plats are typically located in county offices referred to as "Recorder's Offices." To maintain integrity of records, many offices have prohibitions against removing records belonging to their offices; thus, the surveyor must either make copies of the records for comparative purposes or recreate the record by hand.

Once the research has been completed, the surveyor goes out to the field to prepare the survey. Preparation of a boundary survey generally includes locating a point of commencement, which can be accomplished by locating an existing marker of some sort (an iron pin driven into the ground) or through utilization of a Global Positioning System receiver. The surveyor can then utilize an instrument to locate other points of interest, and place markers at boundary corners. Data captured through utilization of the instrument can be captured by a computer, and a software application can be configured to create a survey drawing.

Boundary surveys are but one form of survey. Other types of surveys include American Land Title Association (ALTA) surveys, which are more detailed than boundary surveys. In addition to indicating parcel boundaries, ALTA surveys can indicate location of buildings on a parcel, location of electric and telephone lines on the parcel, location of any easements that may exist with respect to the parcel, manhole covers that exist on the parcel, light fixtures on the parcel, fences that exist on the parcel, etc. Yet another type of survey is a title survey, which is a survey where the surveyor locates existing property markers (but does not place new markers) and indicates a location of a building, set-back lines, and easements on a parcel of interest. Title insurance companies analyze these title surveys prior to providing title insurance to an owner of the parcel or a lender.

Typically, when a property is being transferred and/or financed, title insurance on the property is desired. Title insurance is indemnity insurance against financial loss caused by defects in title of real property and from the invalidity or unenforceability of mortgage liens. Prior to providing title insurance, an agent for a title insurance company researches a parcel of interest, which can include reviewing mortgage records to ascertain whether liens exists on the property, reviewing easement records to ascertain whether the property is subject to any easements, etc. Again, oftentimes this research takes place in multiple offices, rendering collection and organization of title documents difficult.

SUMMARY

The following is a brief summary of subject matter that is described in greater detail herein. This summary is not intended to be limiting as to the scope of the claims.

Described herein are various technologies pertaining to a geometric instrument that can be utilized for curve and chart analysis. Particularly, the instrument described herein can be utilized in connection with analyzing land surveys and data corresponding to land surveys. A data repository can be configured to retain computer-readable data, wherein the computer-readable data comprises a computer-readable land survey. The land survey may be one of a variety of types of land survey, including but not limited to an American Land Title Association (ALTA) survey (which is an ALTA/ACSM land title survey), a site plan, a boundary survey, a topographic survey, a title survey, a tax map, a plat, a flood plain survey, etc. Additionally, the land survey may include elements not traditionally included in land surveys, such as identification of rooms in a particular building, an identification of lessors of such rooms (e.g., in a shopping mall), location of exits in a building, etc.

The computer-readable land survey may comprise text, shapes that are representative of items that can be found in the field (e.g., lines that represent parcel boundaries, geometric enclosures that represent buildings, lines that represent edges of buildings, circles that represent light poles, circles that represent manholes, etc.), metadata that describes the text and shapes (e.g., metadata that indicates that text in the survey map is a legal description, metadata that indicates that a certain portion of the land survey is a surveyor certification, metadata that indicates that a certain line is a boundary line and corresponds to a portion of a legal description, . . . ), and metadata that describes relationships between items in the computer-readable land survey and data related thereto.

In an example embodiment, text that is included in the computer-readable land survey can be extracted from such computer-readable land survey. A graphical user interface may be generated, wherein the graphical user interface includes at least two graphical windows: a first graphical window that is configured to display the land survey to a user, and a second graphical window that is configured to display data (e.g., text) related to the land survey. One or more selectable links can be included in the first window and/or the second window, wherein selection of such a link can cause data displayed to the user to alter. In a first example, text extracted from the computer-readable land survey may be a legal description of a parcel depicted in the land survey, and calls in the legal description can be configured as selectable links. If a user selects one of the selectable links, a view of the land survey in the first window can be altered to prominently display the boundary line that corresponds to the selected link. Additionally, the boundary line and/or accompanying text in the land survey can be highlighted (e.g., shown in a color that is distinctive), thereby allowing a reviewer to quickly ascertain which boundary line corresponds to the selected call.

In another example, text extracted from the computer-readable land survey may be easement information, and at least a portion of a description of an easement can be configured as a selectable link. If a reviewer selects such link, an easement as shown in the land survey can be highlighted and displayed prominently to the reviewer, thereby providing the reviewer with a graphical view of a location of the easement on the parcel. In another example, if the reviewer selects the link, a legal document that describes the easement can be graphically displayed to the reviewer (e.g., in a new graphical window).

As will be described in greater detail below, other data can be linked to the land survey, thereby providing a reviewer with a tool for analyzing charts, such as land surveys. Accordingly, a reviewer need not spend a considerable amount of time searching through paper files to locate data pertaining to a land parcel, but can instead completely research such parcel in an intuitive manner through utilization of the graphical user interface described herein.

Other aspects will be appreciated upon reading and understanding the attached figures and description.

BRIEF DESCRIPTION OF THE DRAWINGS

FIGS. 6-28 are exemplary graphical user interfaces.

DETAILED DESCRIPTION

Figure 1:
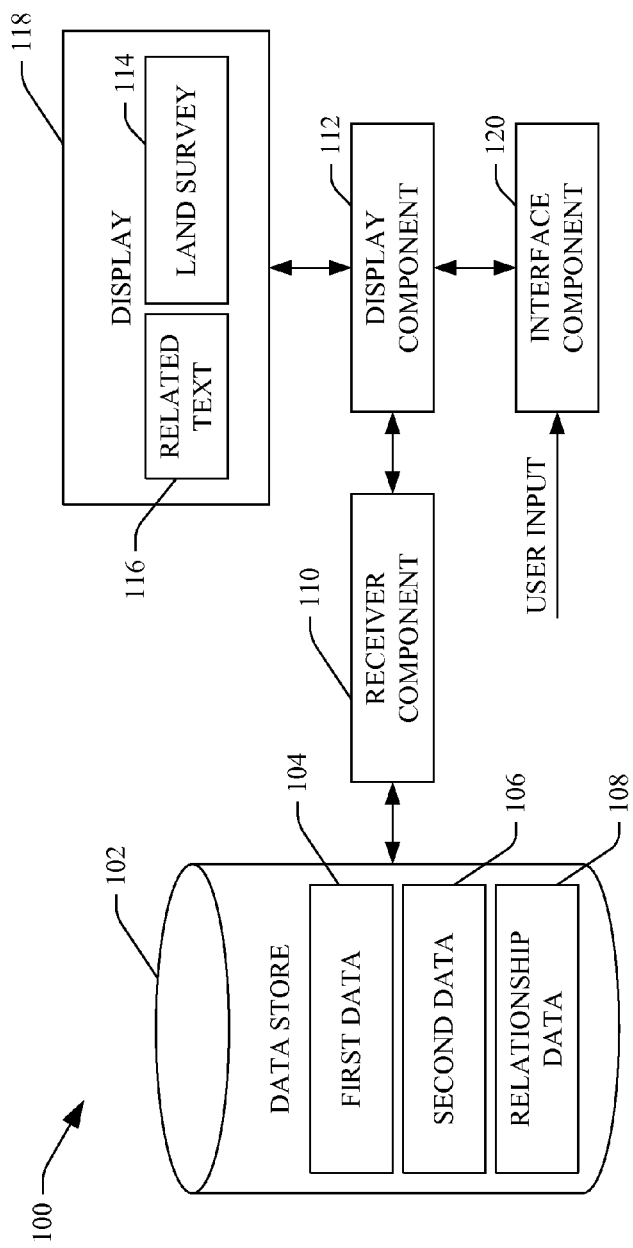
FIG. 1 is a functional block diagram of an exemplary apparatus that facilitates reviewing a computer-readable land survey.

Various technologies pertaining to a geometric instrument that can be utilized to analyze charts will now be described with reference to the drawings, where like reference numerals represent like elements throughout. In addition, several functional block diagrams of exemplary apparatuses are illustrated and described herein for purposes of explanation; however, it is to be understood that functionality that is described as being carried out by certain components may be performed by multiple components. Similarly, for instance, a component may be configured to perform functionality that is described as being carried out by multiple components.

With reference to FIG. 1, an exemplary apparatus 100 that facilitates analyzing charts, such as land surveys, is illustrated. The apparatus 100 includes a data store 102 that retains first data 104 and second data 106. The first data 102 can be data that is representative of a land survey, wherein the land survey can be an American Land Title Association (ALTA) survey, a boundary survey, a title survey, a topographic survey, a plat, a tax map, or other suitable land survey. An ALTA survey is a survey that conforms to certain standards set forth by the ALTA. Typically, an ALTA survey comprises boundary information for a parcel or parcels of interest, easements and restrictions pertaining to the parcel or parcels, as well as indications of permanent or semi-permanent entities existent on the parcel or parcels, such as buildings, telephone poles. The ALTA also shows legal entities, such as easements, building set back lines, etc. A boundary survey refers to a survey that defines/describes boundaries of a parcel or parcels of interest, and where a surveyor places boundary markers in the field to denote the boundary lines. A title survey refers to a survey that indicates locations of buildings and other permanent/semi-permanent entities with respect to boundary lines. A topographic survey is a survey that indicates a representation of cultural and natural features on the ground. Other types of surveys will be appreciated by one of ordinary skill in the art.

The second data 106 can comprise data that pertains to one or more features of the land survey. At least a portion of the second data 106 may be text that is extracted from the first data 104. Extraction of the text from the first data 106 is described in greater detail below. Pursuant to an example, the second data 106 may comprise a legal description of boundaries depicted in the land survey, descriptions of easements or set-back lines pertaining to parcel(s) shown in the land survey, flood zone data pertaining to parcel(s) shown in the land survey, aerial photographs of the parcel(s) shown in the land survey, video pertaining to a portion of one or more parcels shown in the land survey, zoning data pertaining to parcel(s) shown in the land survey, environmental reports pertaining to parcel(s) shown in the land survey, amongst other data.

The data store 102 may further comprise relationship data 108 that indicates one or more relationships between portions of the first data 104 and portions of the second data 106. For example, a legal description of a certain boundary line that is included in the second data 106 may be related by way of the relationship data 108 to a visual depiction of the boundary line in the land survey and/or text pertaining to the boundary line in the land survey (the first data 102). Similarly, a legal description of an easement that is included in the second data 106 may be related by way of the relationship data 108 to a visual depiction of the easement and/or text describing the easement in the land survey. Other relationships between the first data 104 and the second data 106 will be described in greater detail below.

A receiver component 110 can access the data store 102 and is operable to receive the first data 104, the second data 106, and the relationship data 108. A display component 112 is in communication with the receiver component 110 and is operable to process the first data 104, the second data 106, and the relationship data 108 to cause a land survey 114 and related data 116 (which is at least a portion of the second data 106) to be displayed on a computer display 118. In an example, the display component 112 can be configured to generate a graphical user interface that comprises at least two windows: a first window that displays the land survey 114 and a second window that displays the related data 116. Size of the windows can be set by a user and can be modified when desired. Alternatively, the display component 112 may be configured to automatically set the size of the windows as a function of content of the windows and/or screen real estate on the computer display 118. Furthermore, the user may choose to minimize either window. Still further, the display component 112 can cause at least a portion of the land survey 114 and/or a portion of the related data 116 to be displayed as a selectable graphical item, such as a hyperlink.

The apparatus 100 may further comprise an interface component 120 that is operable to recognize a selection of a selectable graphical item in one of the land survey 114 or the related data 116 by a user. For instance, the user may select a hyperlink in the related data 116. The display component 112 can be operable to graphically alter content displayed on the display 118 responsive to receipt of interface component 120 recognizing the selection of the graphical item by the user. In an example, when the graphical item is selected by the user, the display component 112 can cause a relationship between the land survey 114 and the related data 116 to be visually depicted on the land survey 114. Additionally or alternatively, when the graphical item is selected by the user, the display component 112 can cause additional related data to be displayed on the display 118 (e.g., in a separate window).

With more detail pertaining to the display component 112, the first data 104 may be in the form of Design Web Format, and the display component 112 can be or include instructions that are executable by a processor that cause files that correspond to the Design Web Format to be displayed on the display 118. In another example, the second data 106 can comprise data that is in the form of the Portable Document Format, and the display component 112 can be or include executable instructions that cause files that correspond to the Portable Document Format to be displayed on the display 118. In still yet another example, the second data 106 can comprise images, videos, word processing documents, etc., and the display component 112 can be or include executable instructions that cause video files, word processing files, image files, and/or the like to be displayed on the display 118.

Moreover, the display component 112 can be configured to cause views of content in the aforementioned second window to automatically alter upon receipt of a selection from a user of selectable content in the first window. The display component 112 can cause the view to change at a speed that is aesthetically pleasing to a viewer, or can cause the view to change at a speed selected by the viewer. This, the display component 112 can cause a view transition from a first view to a second view to appear smoothly at a speed that is selected by a user. Alternatively, the display component 112 can be configured to instantaneously alter views upon receipt of input from the user.

Various examples pertaining to relationships between the land survey 114 and the related data 116 will now be described. It is to be understood that these examples are presented for purposes or explanation, and are not intended to limit the scope of the hereto-appended claims. Furthermore, examples of user interaction with the land survey 114 and/or the related data 116 are provided herein. Again, such examples are not intended to limit the hereto-appended claims.

In an example, a user may be reviewing the land survey 114 (alone or in combination with the related data 116), and may wish to add one or more comments to the land survey 114 (e.g., to indicate an error in the land survey 114, a reminder to review certain data, . . . ). The interface component 120 can receive an indication from the user that the user wishes to add a comment to a certain portion of the land survey 114, and the display component 112 can be operable to generate a text entry field responsive to the interface component 120 receiving the indication. The user may then enter a comment (in a font, color, and style that may be selected by the user) that is to be displayed at a certain location in the land survey 114. The land survey 114 may then be saved to a computer storage location (e.g., hard drive), such that the comments persist over multiple accesses to the land survey 114.

In another example, a user may be reviewing the related data 116 (alone or in combination with the land survey 114), and may wish to add one or more comments to the related data 116. The interface component 120 can receive an indication from the user that the user wishes to add a comment to the related data 116, and the display component 112 can be operable to generate a text entry field responsive to the interface component 120 receiving the indication. The user may then enter a comment that is to be displayed together with the related data 116 and/or upon selection of a selectable graphical item displayed in conjunction with the related data 116 and/or upon selection of a selectable graphical item pertaining to all comments entered by users. Similar to what has been described above, the comments can be saved such that they persist across multiple accesses of the land survey 114 and/or the related data 116.

In yet another example, the display component 112 can cause a plurality of selectable graphical items to be displayed on the display 118, wherein the plurality of selectable graphical items correspond to a plurality of different types of the related data 116. Thus, a user can select a type of related data to be displayed in conjunction with the land survey 114 by selecting an appropriate selectable graphical item. For instance, the second data 106 can comprise data that is representative of a legal description of at least one parcel of land shown in the land survey 114, such that the display component causes the legal description to be displayed as the related data 116. Furthermore, the relationship data 108 can describe relationships between calls for boundary lines in the legal description and boundary lines depicted in the land survey 114. The display component 112 can further cause portions of the legal description (e.g., one or more calls) to be displayed as selectable graphical items in the related data 116. The interface component 120 can receive a user selection of a selectable graphical item, and the display component 112 can alter contents of the display 118 upon receipt of the user selection of the graphical item. For instance, the display component 112 can alter a view of the land survey 114, such that a boundary line and/or text that describes the boundary line that corresponds to the selected graphical item is prominently displayed on the display 118.

Figure 6:
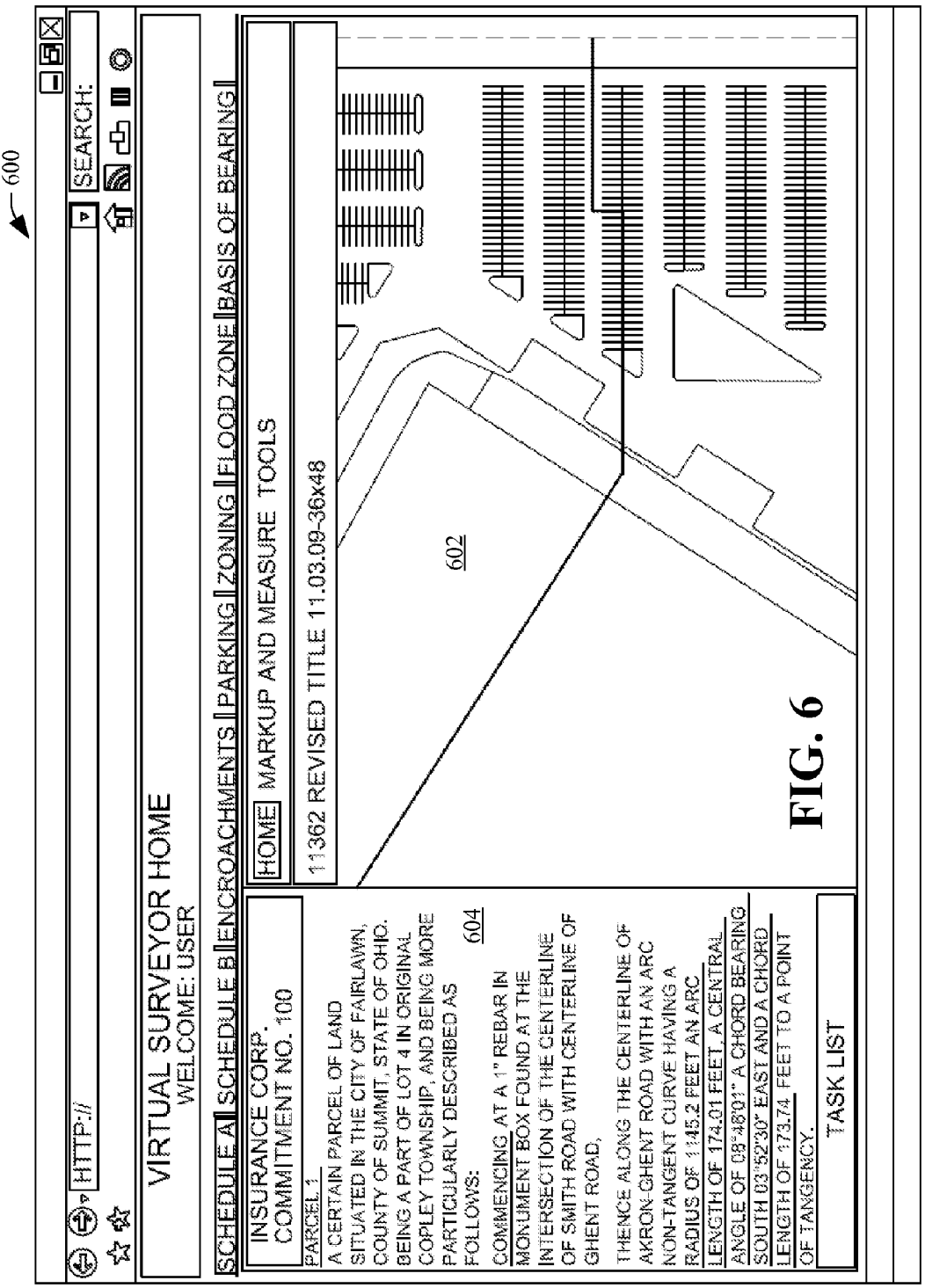

Referring briefly to FIG. 6, a screenshot 600 of an exemplary graphical user interface is illustrated. The graphical user interface, as shown, comprises a plurality of selectable tabs, shown as being titled "Schedule A", "Schedule B", "Encroachments", "Parking", "Zoning", "Flood Zone", and "Basis of Bearing". It is to be understood that a graphical user interface may include other tabs, and that the exemplary tabs shown herein are not intended to limit the scope of the hereto-appended claims. The graphical user interface also comprises a first window 602 that is configured to display at least a portion of the land survey 114 and a second window 604 that displays the related data 116. As shown in the screenshot 600, the user has selected the tab entitled "Schedule A", thus causing the second window 604 to display a legal description of the property shown in the first window 602. Portions of text in the second window 604 can be highlighted (e.g., shown in a certain color, highlighted, etc.) to indicate to the user that such portions of text are selectable by the user (e.g., through utilization of a computer mouse, by way of a touch-sensitive display screen, etc.).

Returning to FIG. 1, the display component 112 can cause the boundary line to be displayed in a distinctive color (e.g., red or other color selected by the user), in a distinctive font, with an emphasized line weight, and/or the like, such that the user can quickly ascertain which portion of the land survey 114 corresponds to the selected graphical item (the selected portion of the legal description). Also, a boundary call corresponding to the boundary line can be displayed distinctively subsequently to a user selecting a portion of the related data 116 that corresponds to the boundary call. While a boundary line has been given as an example, it is to be understood that legal descriptions may include a point of commencement and one or more calls to a particular property corner, after which description of the boundaries of the property begins. Each of such items can be shown as selectable graphical items in the related data 116, and selection of such graphical items can cause corresponding portions of the land survey 114 to be prominently displayed (e.g., view altered and/or displayed in a distinctive color).

Figure 7:
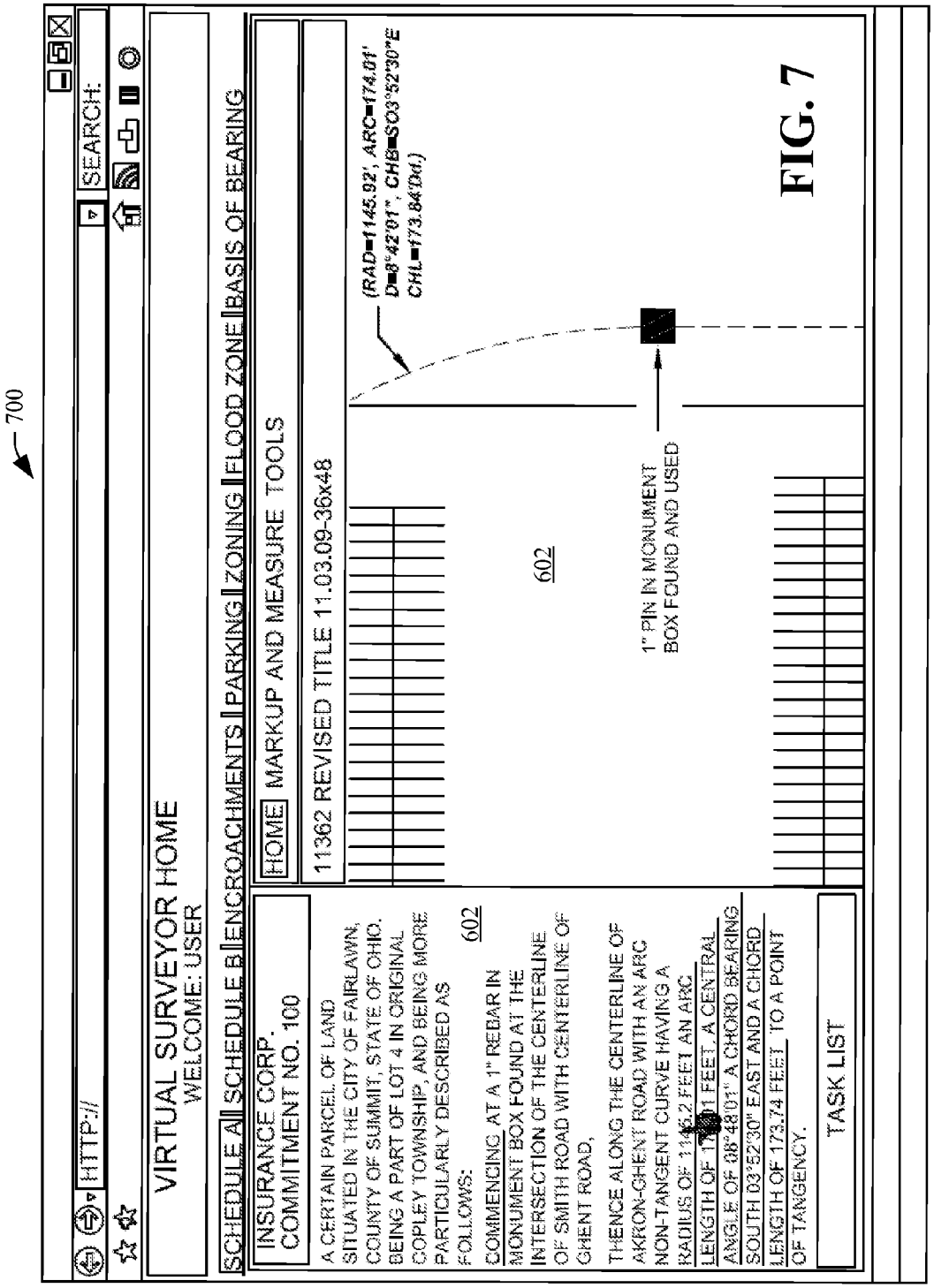

Referring briefly to FIG. 7, a screenshot 700 of an exemplary graphical user interface is illustrated. As shown, the user selects a portion of text (the related data 116) in the second window 604 that is displayed as being selectable. Responsive to the user selecting such text, a view of the land survey 114 in the first window 602 alters to prominently display the boundary line and associated boundary call that corresponds with the selected portion of text. For example, the view of the land survey 114 can alter in the first window 602 such that the boundary line and associated boundary call are displayed in approximately the center of the first window 602 and the boundary line and associated boundary call are displayed in a font, line weight, and/or color that differentiates such data from other data in the land survey. Moreover, in an example, the entirety of the parcel can be displayed in a distinctive manner, rather than only the boundary line being selected by the user in the second window 604.

Returning again to FIG. 1, continuing with the example where the related data 116 is displayed as being a legal description, the display component 112 can cause a selectable link to be displayed to the user that corresponds to an image of an official legal description (as recorded in a deed of the parcel shown in the land survey, for example). The interface component 120 can receive an indication that the user has selected the graphical item, and the display component 112 can cause the official legal description to be displayed on the display 118 responsive to the interface component 120 receiving the indication. The official legal description can be displayed in a new window and/or in a window corresponding to the land survey 114 and/or a window corresponding to the related data 116.

Figure 8:
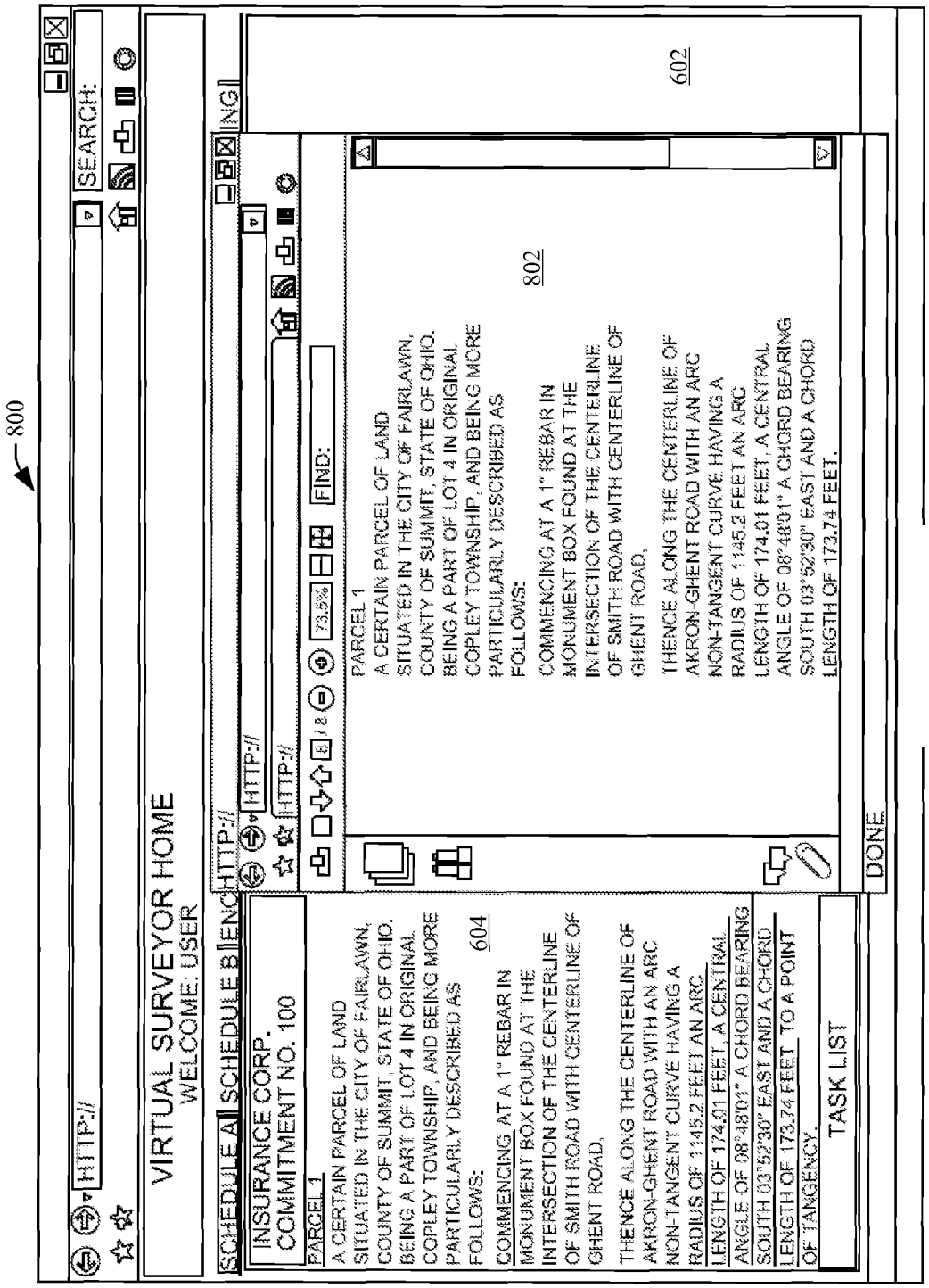

Now turning to FIG. 8, a screenshot 800 of an exemplary graphical user interface is illustrated. In the screenshot 800, the user has selected a portion of the related data 116 displayed in the second window 604 that causes a third window 802 to be presented to the user, wherein the third window 802 comprises an image of the official legal description of the property corresponding to the land survey 114. The third window 802 can, for example, be included in a separate Internet browser window or can be included in an Internet browser window with the first window 602 and the second window 604.

Figure 9:
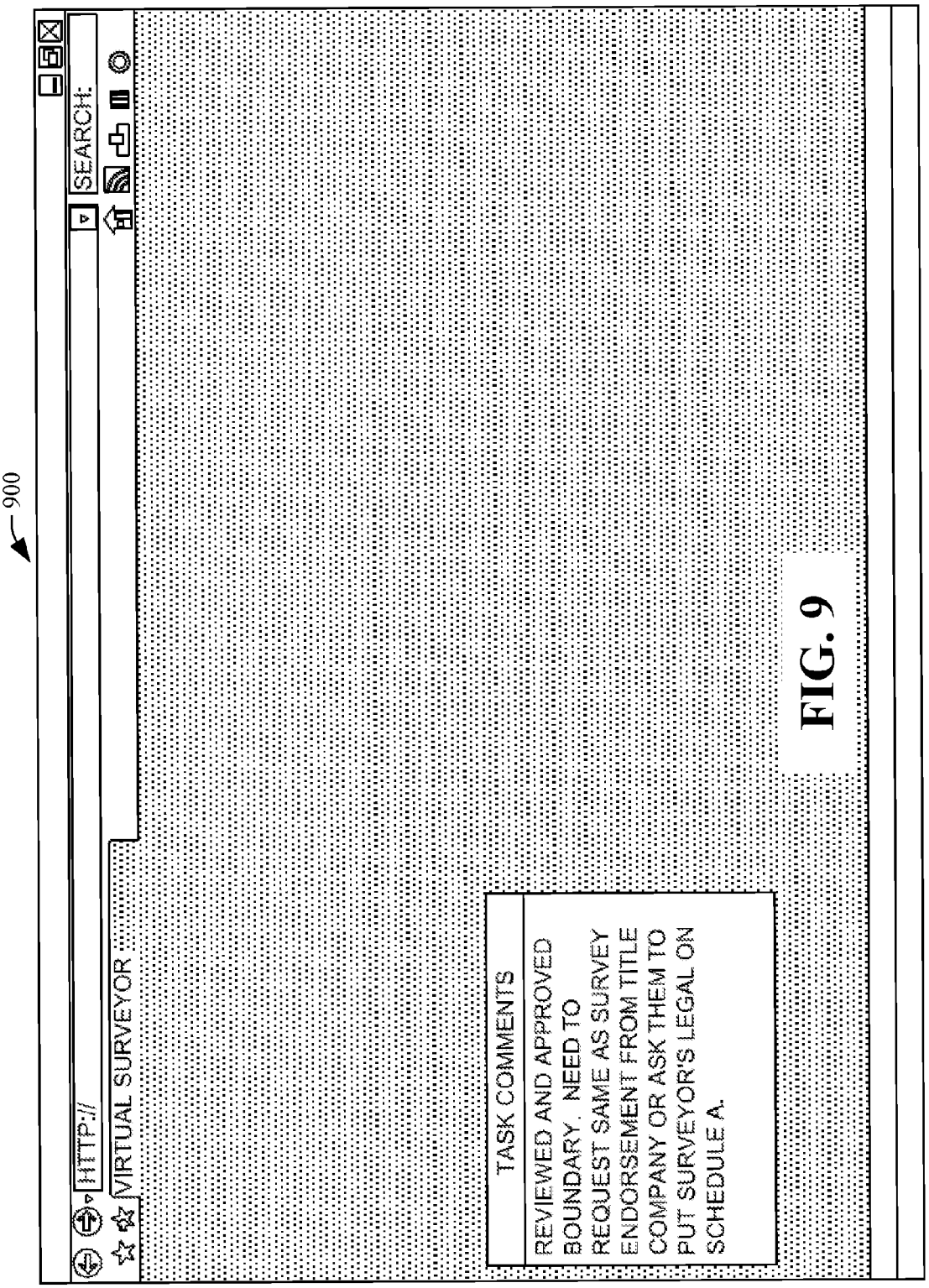

With reference now to FIG. 9, a screenshot 900 of an exemplary graphical user interface is illustrated. This screenshot 900 illustrates that the user can generate comments pertaining to the related data 116 shown in the second window 604, and such comments can be stored such that they are persisted across multiple accesses to the land survey 114. Such comments are stored in an organized manner. For instance, if the user selects the tab titled "Schedule A" and generates comments for the selected tab, then such comments can be stored such that they are accessible via the selected tab.

Figure 10:
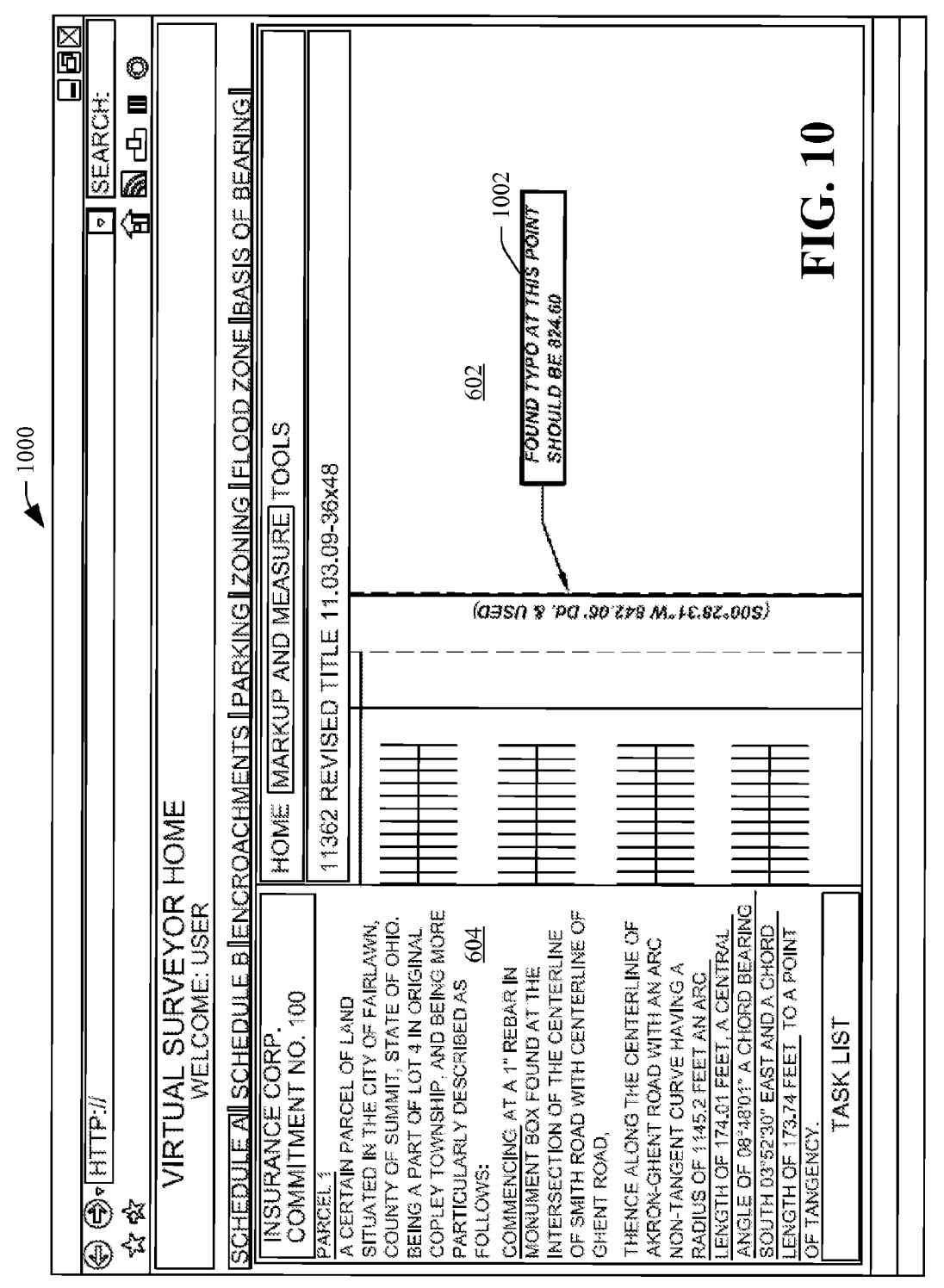

Turning to FIG. 10, a screenshot 1000 of an exemplary graphical user interface is illustrated. The screenshot 1000 illustrates that the user can generate comments 1002 with respect to one or more portions of the land survey 114, and such comments 1002 can be displayed in the first window 602 together with the land survey 114. Again, these comments persist across multiple accessed (possibly by different users) to the land survey 114, and can be displayed in a color/font that is selectable by the user.

Returning to FIG. 1, in another example, the second data 106 can comprise data that is typically found in schedule B of title searches, including but not limited to data pertaining to easements to which the parcel depicted in the land survey 114 is subject, data pertaining to building lines to which the parcel depicted in the land survey 114 is subject, etc. The relationship data 108 can indicate relationships between easements described in the second data 106 and easements shown on the land survey 114. The display component 112, through analysis of the relationship data 112, can cause portions of the related data 116 to be displayed as selectable graphical items. In this example, such portions of the related data 116 can be descriptions of easements, set-back lines, and the like depicted in the land survey 114. The interface component 120 can receive a user selection of a selectable graphical item in the related data 116, and the display component 112 can cause the easement as shown in the land survey 114 to be highlighted and/or prominently displayed. Additionally or alternatively, the related data 116 may include a selectable graphical item that corresponds to a legal document from a county recorder's office that describes the easement. The interface component 120 can receive an indication that the user has selected the selectable graphical item, and the display component 112 can cause the legal document describing the easement to be displayed on the display 118 to the user. Again, such legal document may be displayed in a separate window and/or in the window corresponding to the related data 116 and/or the window corresponding to the land survey 114.

Figure 11:
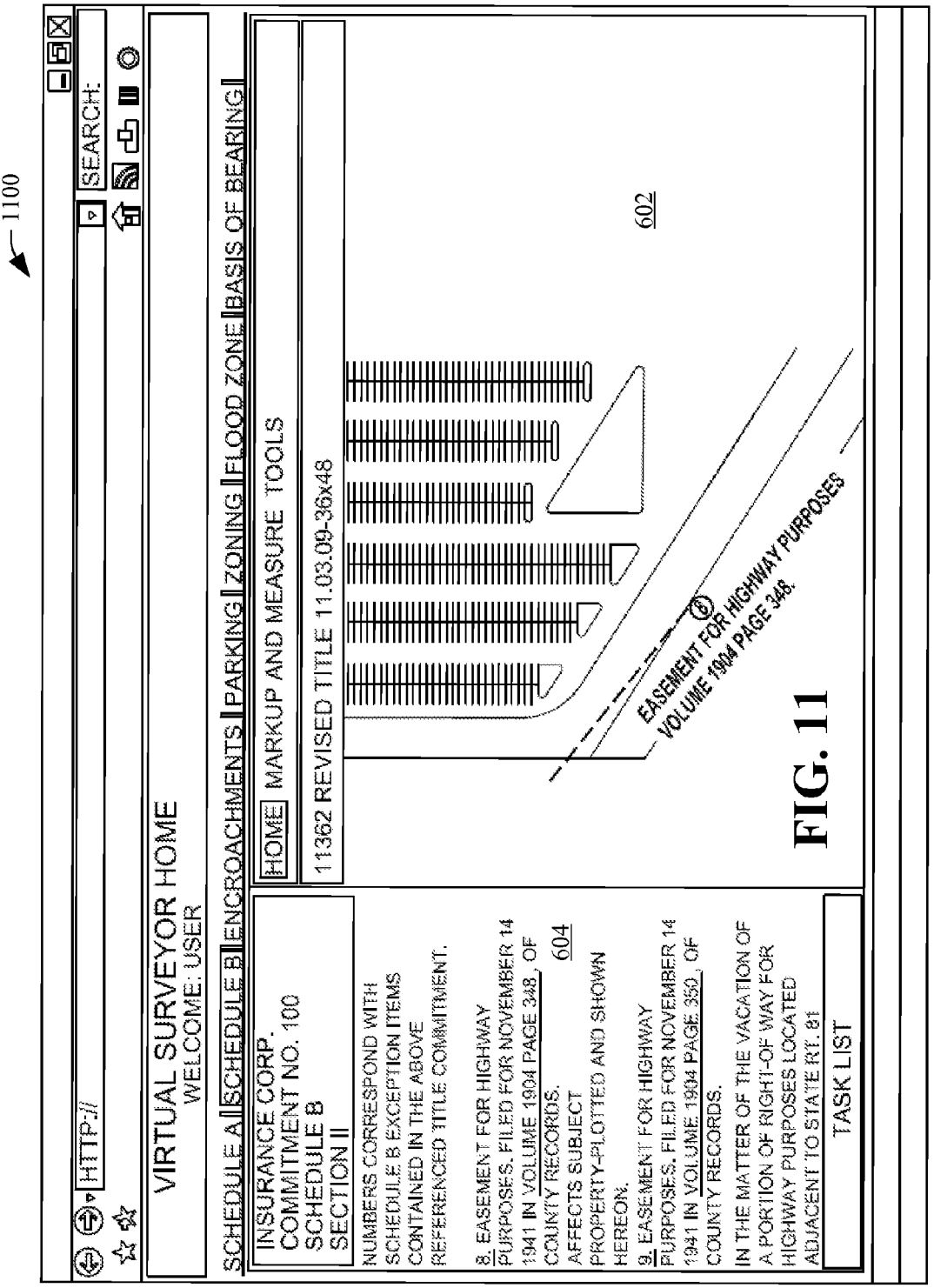

Turning to FIG. 11, a screenshot 1100 of the exemplary graphical user interface is shown. In this screenshot 1100, the user has selected the tab entitled "Schedule B", thereby causing data pertaining to easements to which the parcel is subjected to be displayed in the second window 604. At least some text shown in the second window 604 is highlighted to indicate to the user that the text is selectable. In this example, the user selects text in the second window 604, and subsequent to selection of such text, the view of the land survey 114 is altered in the first window 602 to prominently display the portion of the land survey 114 that corresponds to the selected text. In the example depicted in the screenshot 1100, the user has selected text in the second window 604 corresponding to a particular easement, and the view of the land survey 114 is altered in the first window 602 to prominently display the particular easement to the user. Lines and/or text in the first window 602 corresponding to the easement can be highlighted in such a manner to quickly indicate to the user that the easement shown on the land survey 114 in the first window 602 corresponds to the portion of text selected in the second window 604. This highlighting of the lines and/or text can include displaying the lines and/or text in a color different than other lines and/or text, displaying lines and/or text with a greater line weight than other lines and/or text, etc.

Returning again to FIG. 1, the second data 106 can comprise data describing encroachment of structures over boundary lines in the land survey 114 as found by a surveyor. The relationship data 108 can relate text describing one or more encroachments with visual depictions of encroachments in the land survey 114. The display component 112 can cause a portion of the related data 106 to be displayed as a selectable graphical item. The interface component 120 can receive a user selection of the selectable graphical item, which is representative of an encroachment found by the surveyor. Responsive to the interface component 120 receiving the user selection, the display component 112 can cause a view of the land survey 114 to alter to prominently display the encroachment in the land survey 114. Additionally or alternatively, the display component 112 can cause the encroachment to be highlighted, such as shown in a prominent color.

Figure 12:
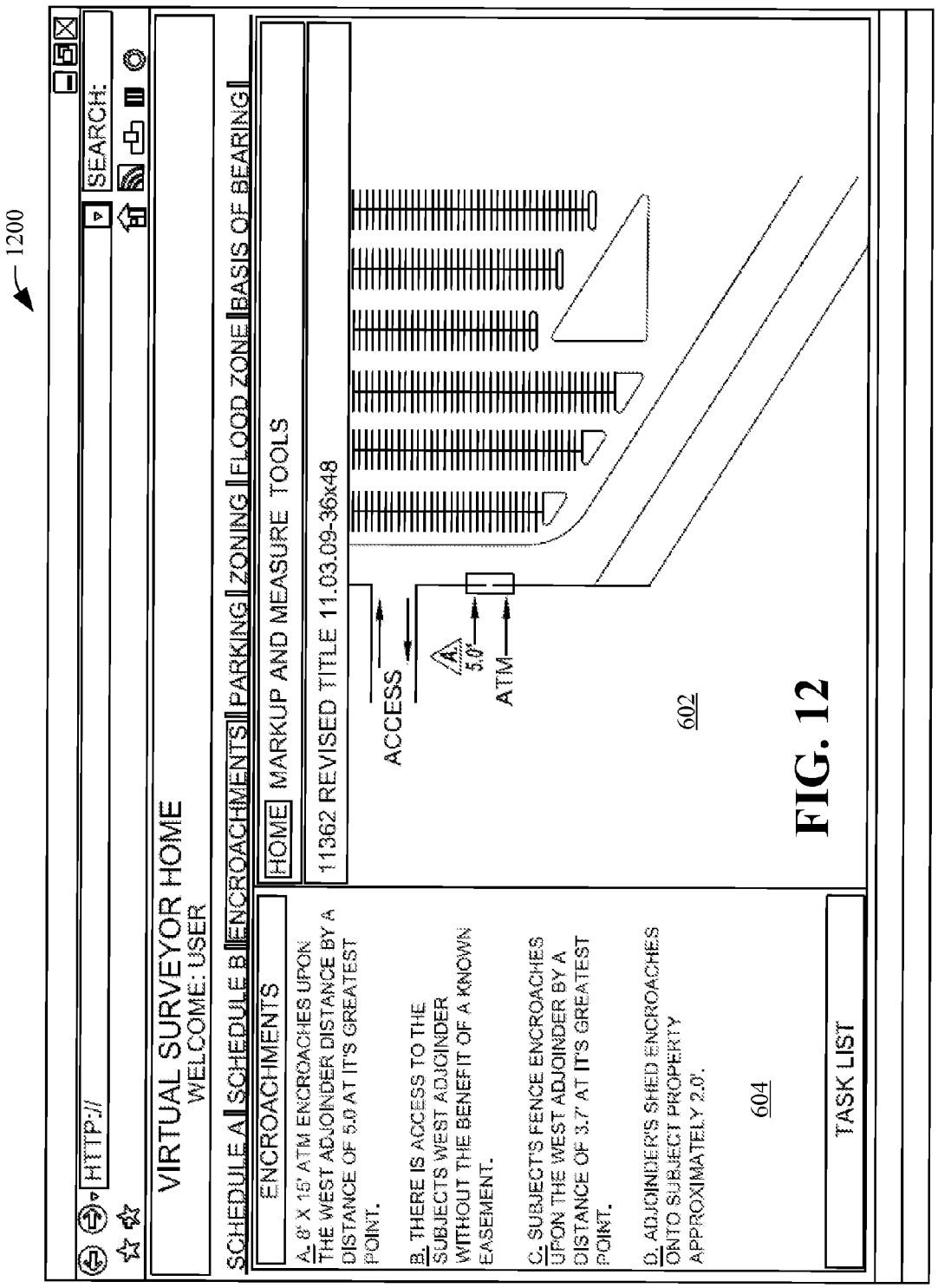

With reference now to FIG. 12, a screenshot 1200 of the exemplary graphical user interface is presented, wherein the screenshot 1200 illustrates display of encroachment data in the land survey subsequent to the user selecting text corresponding to the encroachment in the second window 604. With more specificity, in the screenshot 1200 it can be appreciated that the user has selected the tab entitled "encroachments", and subsequent to such selection the second window 604 displays text to the user pertaining to encroachments corresponding to the land survey 114. At least some of such text is shown as being selectable (e.g., displayed in a certain color, underlined, etc.). In the example screenshot 1200, the user has selected at least some selectable text in the second window 604, and responsive thereto an encroachment in the land survey 114 corresponding to the selected text is displayed prominently in the first window 602. Again, such prominent display can include altering view of the land survey 114 to "zoom in" on the selected encroachment and/or to display the encroachment in a particular color, font, line weight, etc. such that the encroachment is readily identifiable by the user. In the exemplary screenshot 1200, the user selects text in the second window 604 that indicates that an Automated Teller Machine (ATM) encroaches over a boundary line of the parcel included in the land survey 114. Subsequent to such selection, the aforementioned encroachment is prominently displayed to the user in the first window 602.

Returning again to FIG. 1, the second data 106 can comprise data describing parking spaces in the parcel(s) shown in the land survey 114 as found by a surveyor. The relationship data 108 can relate text describing the parking spaces with visual depictions of the parking spaces in the land survey 114. The display component 112 can cause a portion of the related data 106 to be displayed as a selectable graphical item. The interface component 120 can receive a user selection of the selectable graphical item, which is representative of parking spaces on the parcel(s). Responsive to the interface component 120 receiving the user selection, the display component 112 can cause a view of the land survey 114 to alter to prominently display the parking spaces in the land survey 114. Additionally or alternatively, the display component 112 can cause the parking spaces to be highlighted, such as shown in a prominent color. Still further, the display component 112 can support a counting feature, such that the user can click on parking symbols shown in the land survey 114, and such parking symbols can change color and be counted in a particular window. With more specificity, the land survey can include several parking symbols, and such parking symbols can be displayed in a particular color (e.g., red). The user can click on a parking symbol, which causes the symbol to turn black (or other suitable color), and a number of parking spaces is automatically incremented in a parking space count view.

Figure 13:
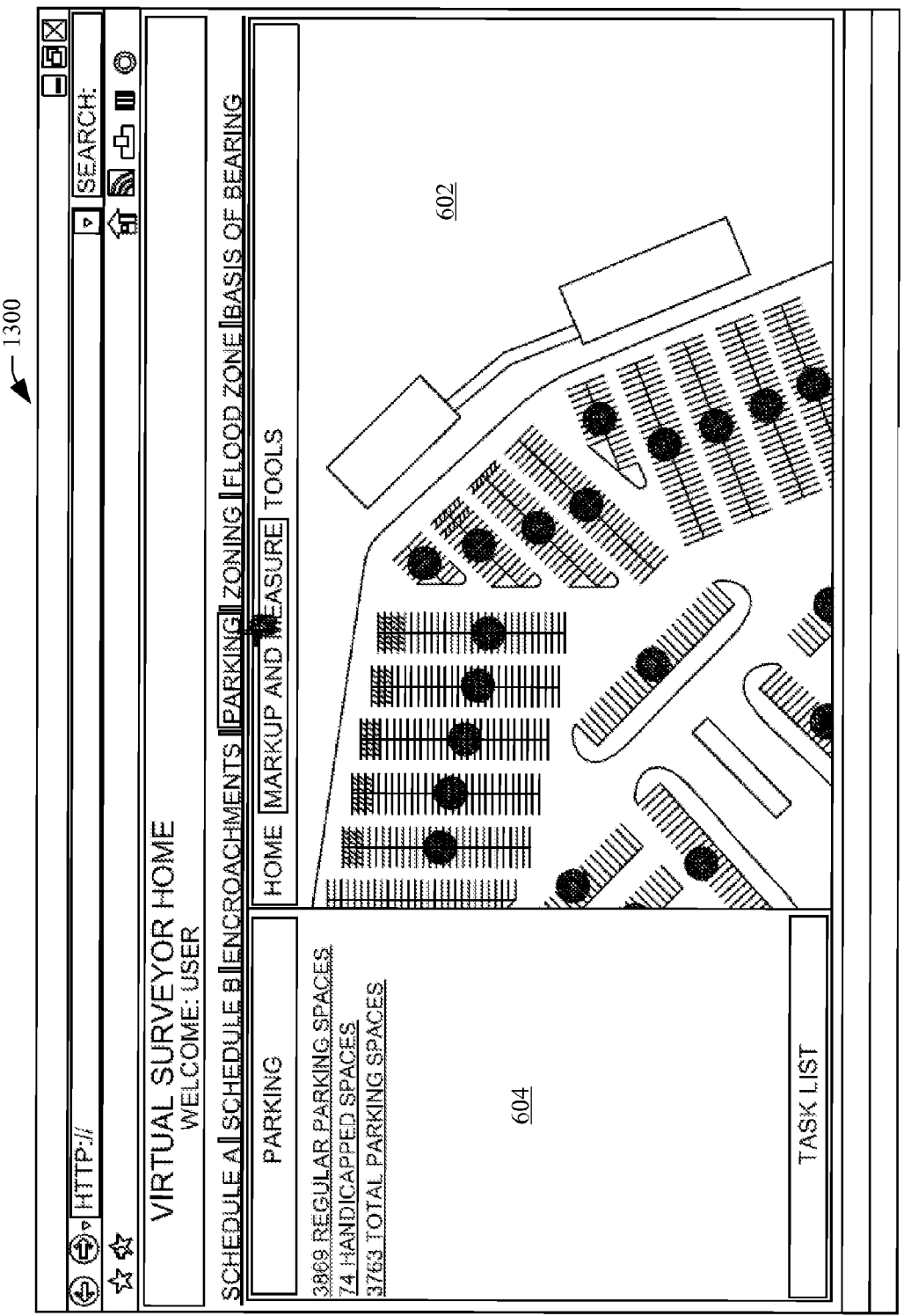

With brief reference to FIG. 13, a screenshot 1300 of the exemplary graphical user interface is depicted, wherein the screenshot illustrates display of parking data to the user. For example, the user can select the tab entitled "parking", thereby causing the second window 604 to be populated with text pertaining to parking spaces included in the land survey 114. At least some of text can be highlighted to indicate to the user that such text is selectable. Subsequent to the user selecting the text, the view in the first window 602 can alter to prominently display parking spaces included in the land survey 114. Additionally, as can be ascertained, selectable symbols can be included in the first window 602, wherein each selectable symbol may correspond to a plurality of parking spaces. The symbols can be displayed in a particular color, and such color can change upon the user selecting the symbols in the first window 602. Moreover, the total number of parking spaces corresponding to the selected symbol can be displayed to the user, and if the user selects multiple symbols, the number of parking spaces can be summed.

Returning again to FIG. 1, in another example, the second data 106 can comprise data describing zoning classifications/restrictions pertaining to the parcel(s) shown in the land survey 114. The relationship data 108 can relate text describing zoning classifications/restrictions with visual depictions of the zoning classifications/restrictions in the land survey 114. The display component 112 can cause a portion of the related data 106 to be displayed as a selectable graphical item. The interface component 120 can receive a user selection of the selectable graphical item, which is representative of a zoning classification/restriction pertaining to the parcel(s). Responsive to the interface component 120 receiving the user selection, the display component 112 can cause a view of the land survey 114 to alter to prominently display a zoning classification/restriction in the land survey 114. Additionally or alternatively, the display component 112 can cause the zoning classification/restriction to be highlighted, such as shown in a prominent color. Additionally or alternatively, the related data 116 may include a selectable graphical item that corresponds to a zoning report and/or a legal document from a county recorder's office that describes the zoning classification/restriction. The interface component 120 can receive an indication that the user has selected the selectable graphical item, and the display component 112 can cause the zoning report and/or the legal document describing the zoning classification/restriction to be displayed on the display 118 to the user. Such document may be displayed in a separate window and/or in the window corresponding to the related data 116 and/or the window corresponding to the land survey 114.

Figure 14:
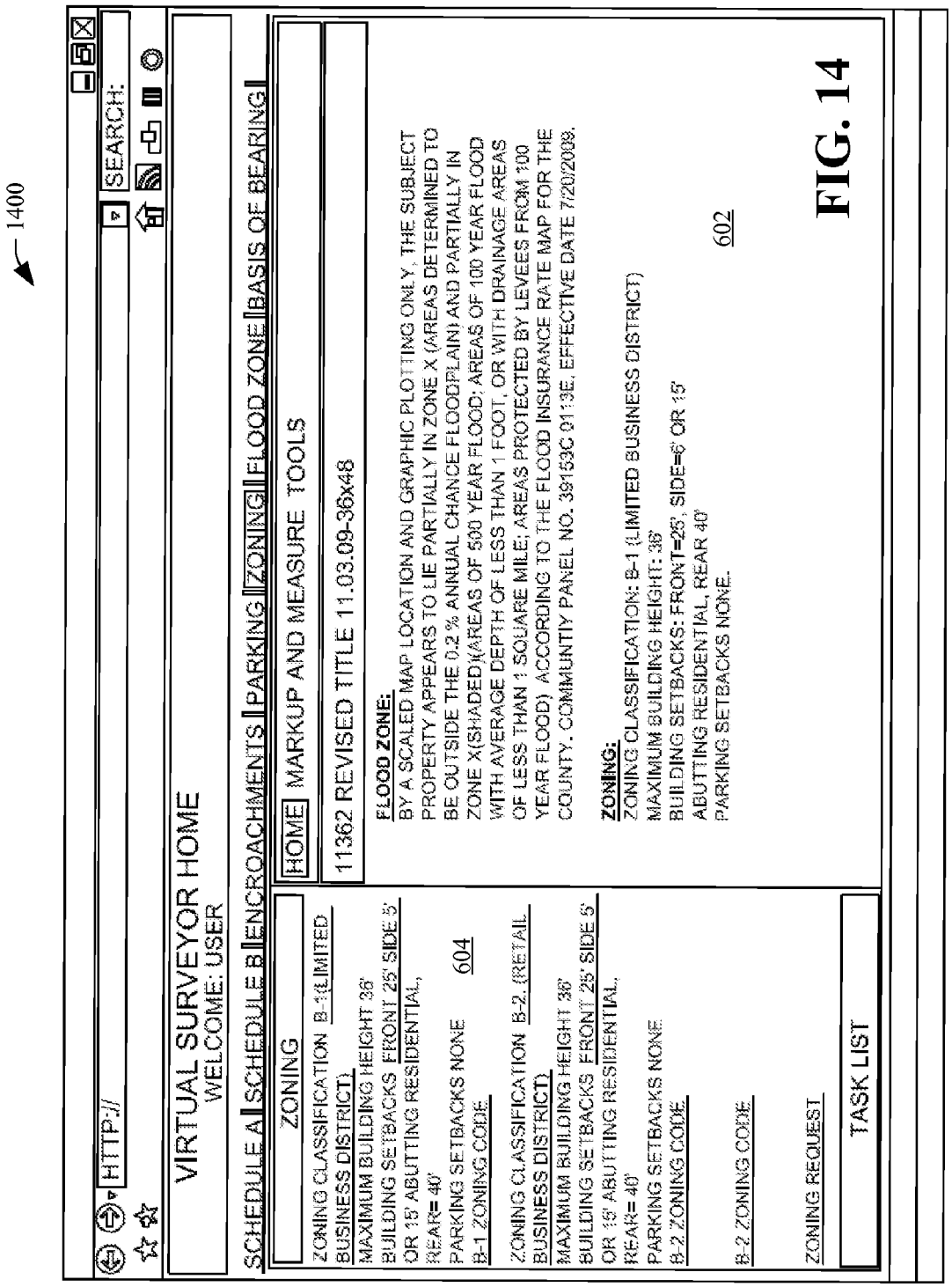

Now referring to FIG. 14, a screenshot 1400 of the exemplary graphical user interface is illustrated, wherein the screenshot displays zoning data to the user. In this screenshot, the user has selected the tab entitled "zoning", which causes the second window 604 to be populated with text (or other data) pertaining to zoning ordinances/set back lines pertaining to the land survey 114. Further, upon selecting the tab entitled "zoning", the view of the first window can alter to display data pertaining to zoning in the land survey 114. At least some of such text can be highlighted in the second window 604, wherein the highlighted text indicates to the user that the user can select such text.

Figure 15:
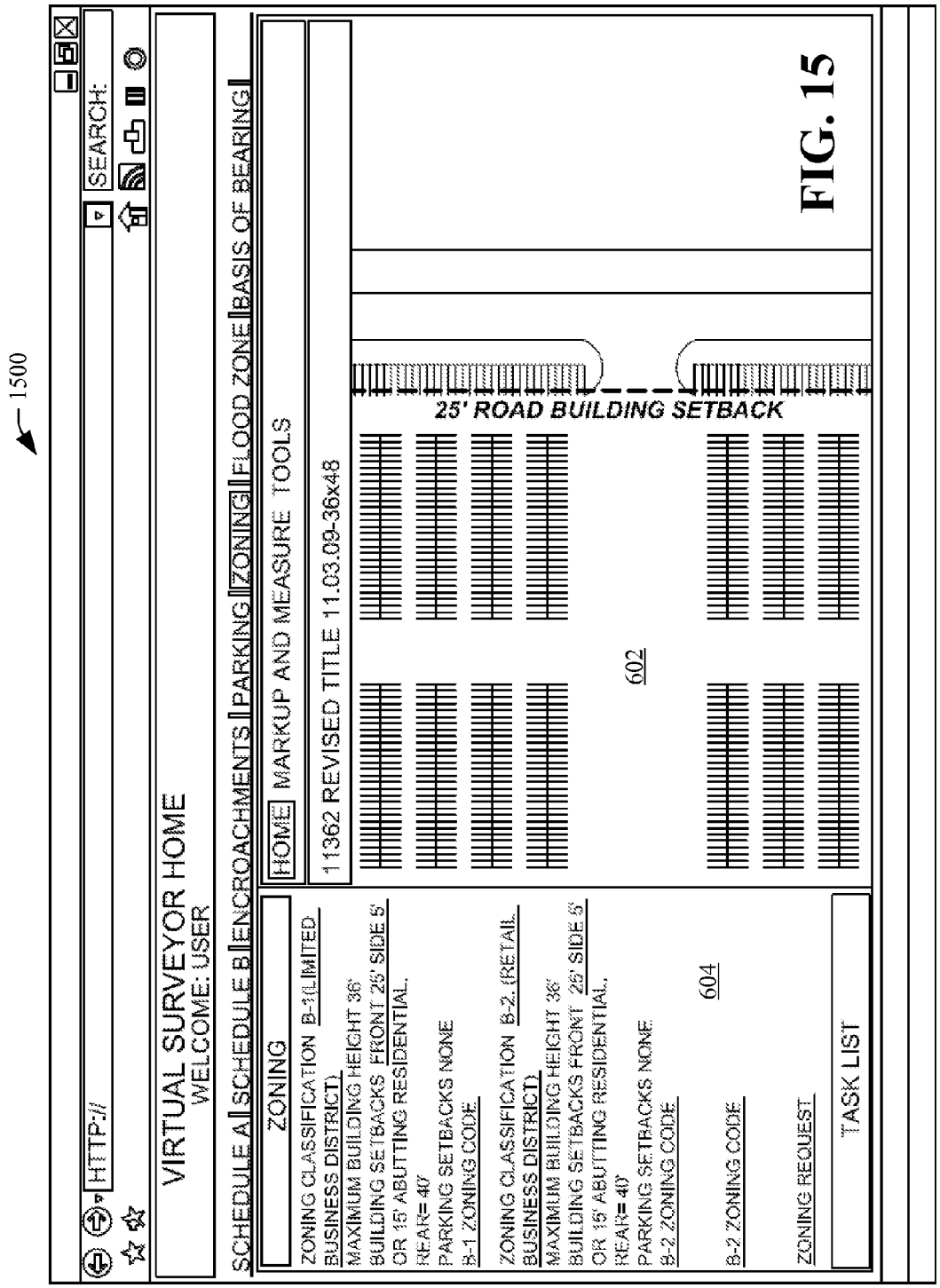

Referring now to FIG. 15, another screenshot 1500 of the exemplary graphical user interface is shown. This screenshot 1500 shows that the user has selected the tab entitled "zoning", and has further selected selectable text in the second window 604. In the example shown, the user has selected text pertaining to a twenty five foot building set back line. Subsequent to receiving the selection of such text, the view of the land survey 114 can be altered in the first window 602 such that the selected building set back line is displayed prominently in the first window 602 (e.g., with a particular color, line weight, etc.).

Returning again to FIG. 1, in another example, the second data 106 can comprise an environmental report pertaining to the parcel(s) shown in the land survey. The display component 112 can cause a portion of the related data 106 to be displayed as a selectable graphical item. The interface component 120 can receive a user selection of the selectable graphical item, and responsive to the interface component 120 receiving the user selection, the display component 112 can cause the environmental report to be displayed on the display 118. The environmental report may be displayed in a separate window, for example, or can be displayed in the window that shows the related data 116 and/or can be displayed in the window that shows the land survey 114.

In still yet another example, the second data 106 can comprise data describing flood zone data pertaining to the parcel(s) shown in the land survey 114. The relationship data 108 can relate text describing a flood plain with visual depictions of the flood plain in the land survey 114. The display component 112 can cause a portion of the related data 106 to be displayed as a selectable graphical item. The interface component 120 can receive a user selection of the selectable graphical item, which is representative of the flood plain pertaining to the parcel(s). Responsive to the interface component 120 receiving the user selection, the display component 112 can cause a view of the land survey 114 to alter to prominently display the flood plain in the land survey 114. Additionally or alternatively, the display component 112 can cause the flood plain to be highlighted, such as shown in a prominent color. Additionally or alternatively, the related data 116 may include a selectable graphical item that corresponds to a flood plain map. The interface component 120 can receive an indication that the user has selected the selectable graphical item, and the display component 112 can cause the flood plain map to be displayed on the display 118 to the user. Such flood plain map may be displayed in a separate window and/or in the window corresponding to the related data 116 and/or the window corresponding to the land survey 114.

Figure 16:
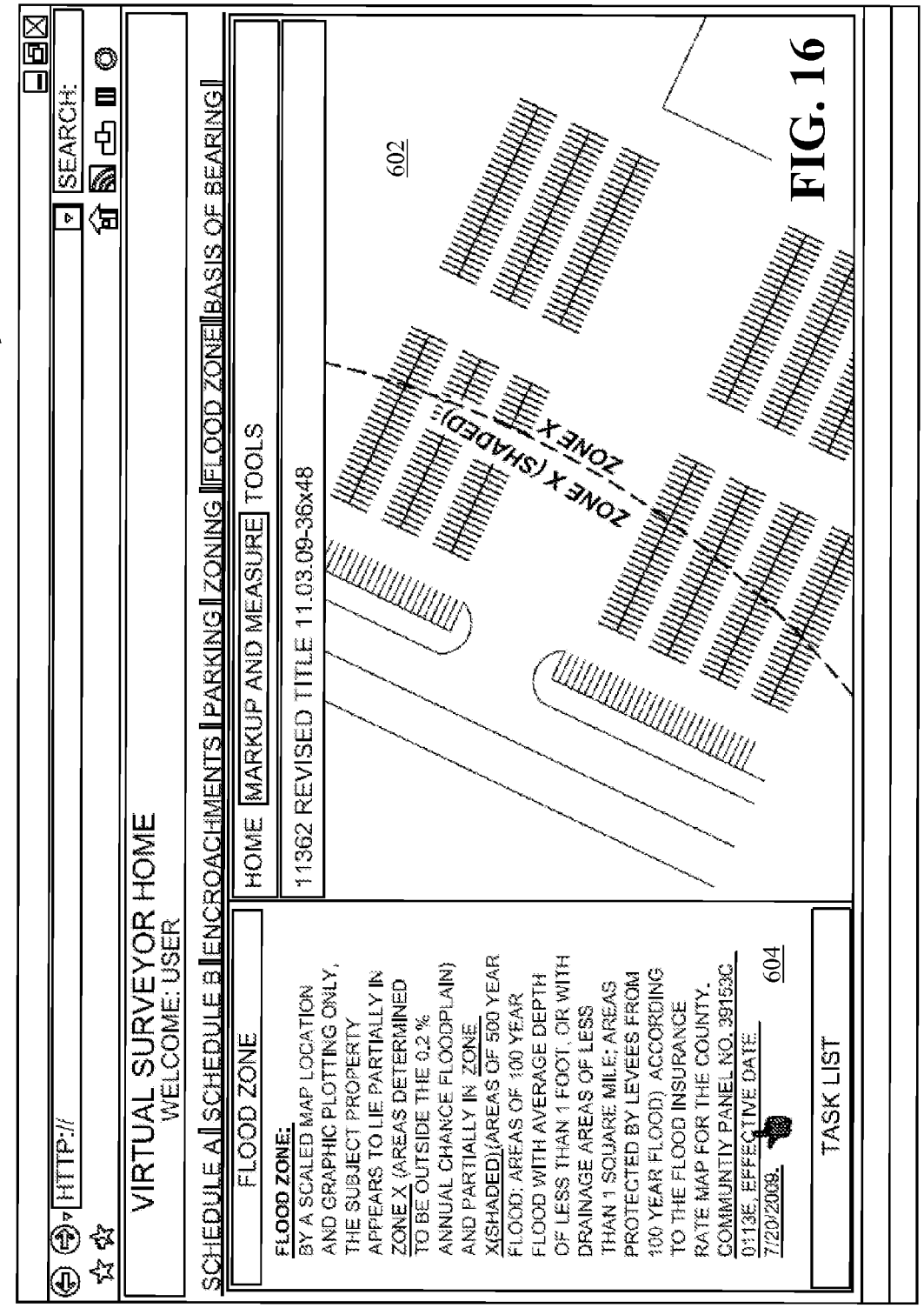

Turning briefly to FIG. 16, a screenshot 1600 of the exemplary graphical user interface is depicted, wherein the screenshot 1600 illustrates display of flood plain data. In this exemplary screenshot 1600, the user selects the tab entitled "flood zone", and responsive to such selection text pertaining to a flood zone with respect to parcel(s) in the land survey 114 is displayed in the second window 604. At least some of text can be shown to the user as being selectable (displayed in a certain color, underlined, etc.). For example, the user can select the text "Zone X", which is displayed as being selectable by the user. Responsive to such selection, a portion of the land survey 114 corresponding to the selected "Zone X" can be displayed to the user in the first window 602. For instance, a flood plain boundary and/or text describing the flood plain boundary that corresponds to the selected text can be displayed centrally in the first window 602 and can be highlighted to be prominently displayed to the user (e.g., displayed as being a distinctive color, displayed in a certain font, etc.).

Figure 17:
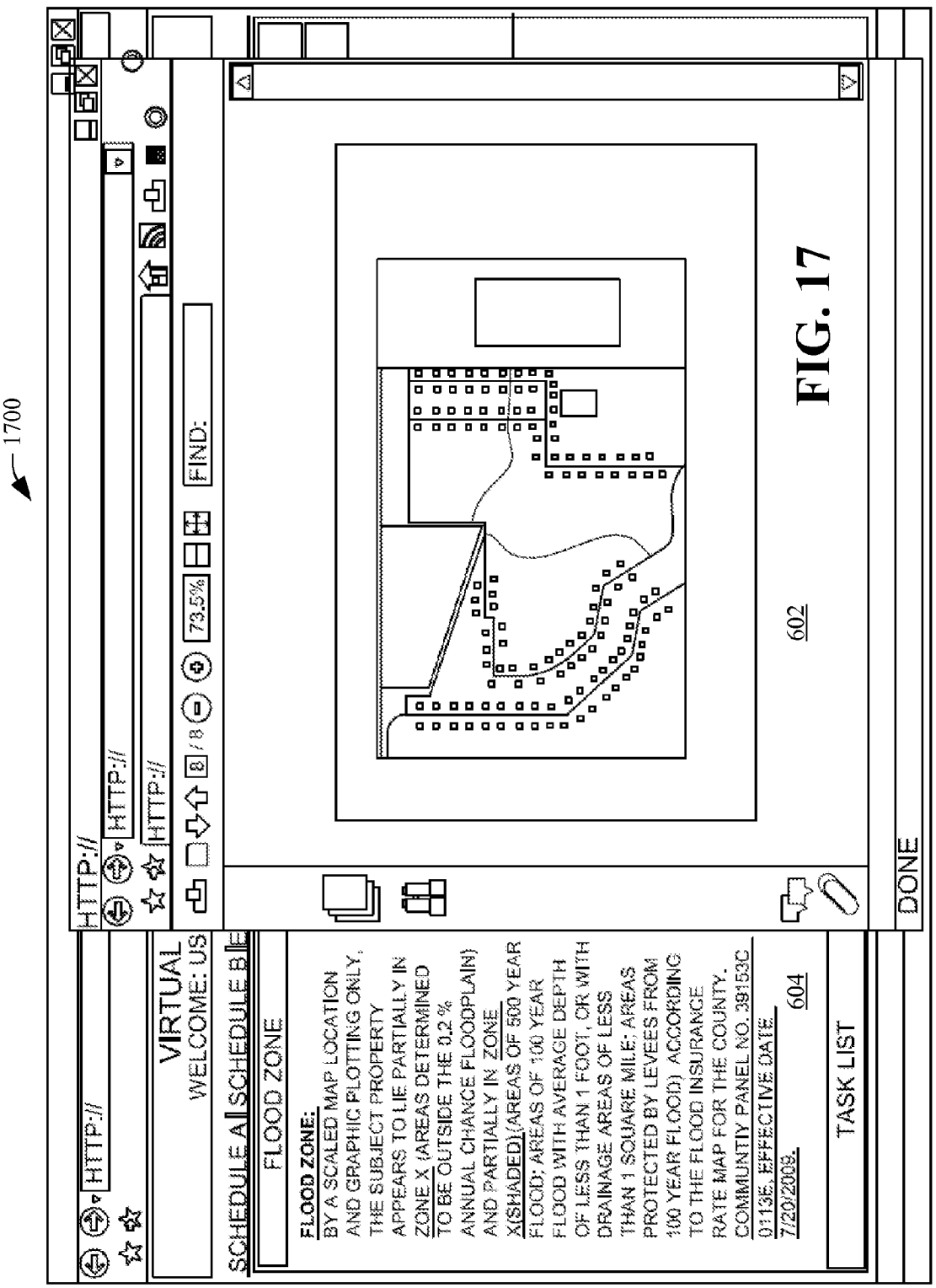

Referring to FIG. 17, another screenshot 1700 of the exemplary graphical user interface is depicted. In this screenshot 1700, the user has selected the tab entitled "flood zone", and responsive thereto text pertaining to a flood zone with respect to parcel(s) in the land survey 114 is displayed in the second window 604 as indicated above. In the example shown here, the user has selected selectable text in the second window 604 that causes a new window 1702 to be displayed to the user, wherein the new window comprises an image of an official flood plain map that can be viewed by the user. For instance, the image of the flood plain map can be displayed in a new Internet browser window.

Returning again to FIG. 1, in another example, the second data 106 can comprise data describing a basis of bearing for the land survey 114. The relationship data 108 can relate text describing the basis of bearing with a visual depiction of the basis of bearing in the land survey 114. The display component 112 can cause a portion of the related data 106 to be displayed as a selectable graphical item. The interface component 120 can receive a user selection of the selectable graphical item, which is representative of the basis of bearing. Responsive to the interface component 120 receiving the user selection, the display component 112 can cause a view of the land survey 114 to alter to prominently display the basis of bearing in the land survey 114. Additionally or alternatively, the display component 112 can cause the basis of bearing to be highlighted, such as shown in a prominent color.

Figure 18:
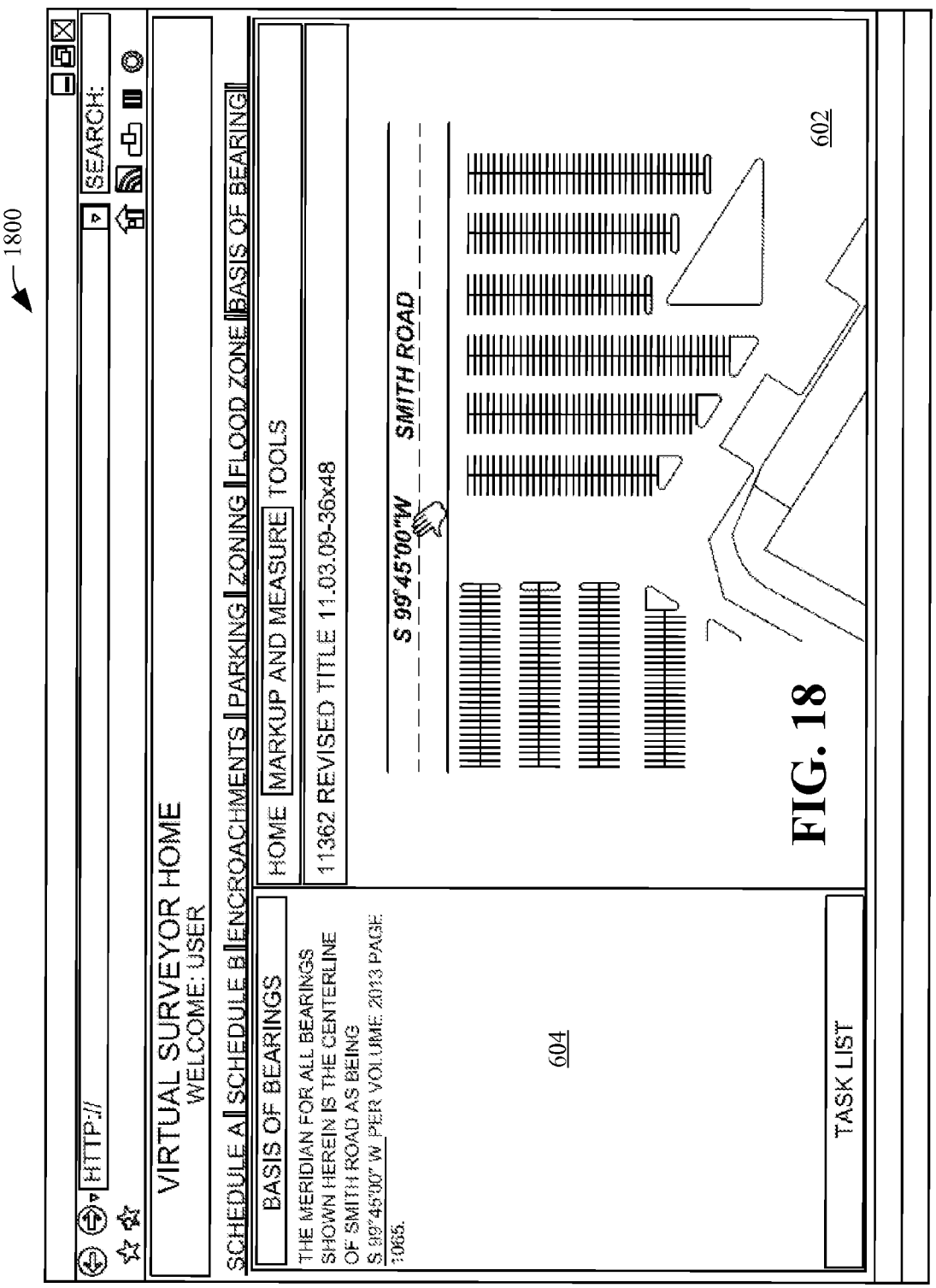

Turning to FIG. 18, an exemplary screenshot 1800 of the graphical user interface is illustrated, wherein the screenshot 1800 depicts prominent display of a basis of bearing used in the land survey 114. In the exemplary screenshot 1800, the user has selected the tab entitled "basis of bearing", and responsive to such selection, text pertaining to the basis of bearing is displayed in the second window 604. At least some of such text is shown as being selectable by the user, and in this example the user has selected some selectable text pertaining to the basis of bearing in the land survey 114. Responsive to the user selecting such selectable text, a portion of the land survey 114 pertaining to the selected text is prominently displayed in the first window 602. In this example, the basis of bearing used to generate the land survey 114 is displayed centrally in the first window 602, and the basis of bearing and corresponding text is shown in a prominent manner (e.g., shown in a distinctive color, with a particular font, etc.). Therefore, rather than searching through a paper version of the land survey 114 for the basis of bearing, the graphical user interface can visually provide the basis of bearing to the user with one or two mouse clicks.

Figure 19:
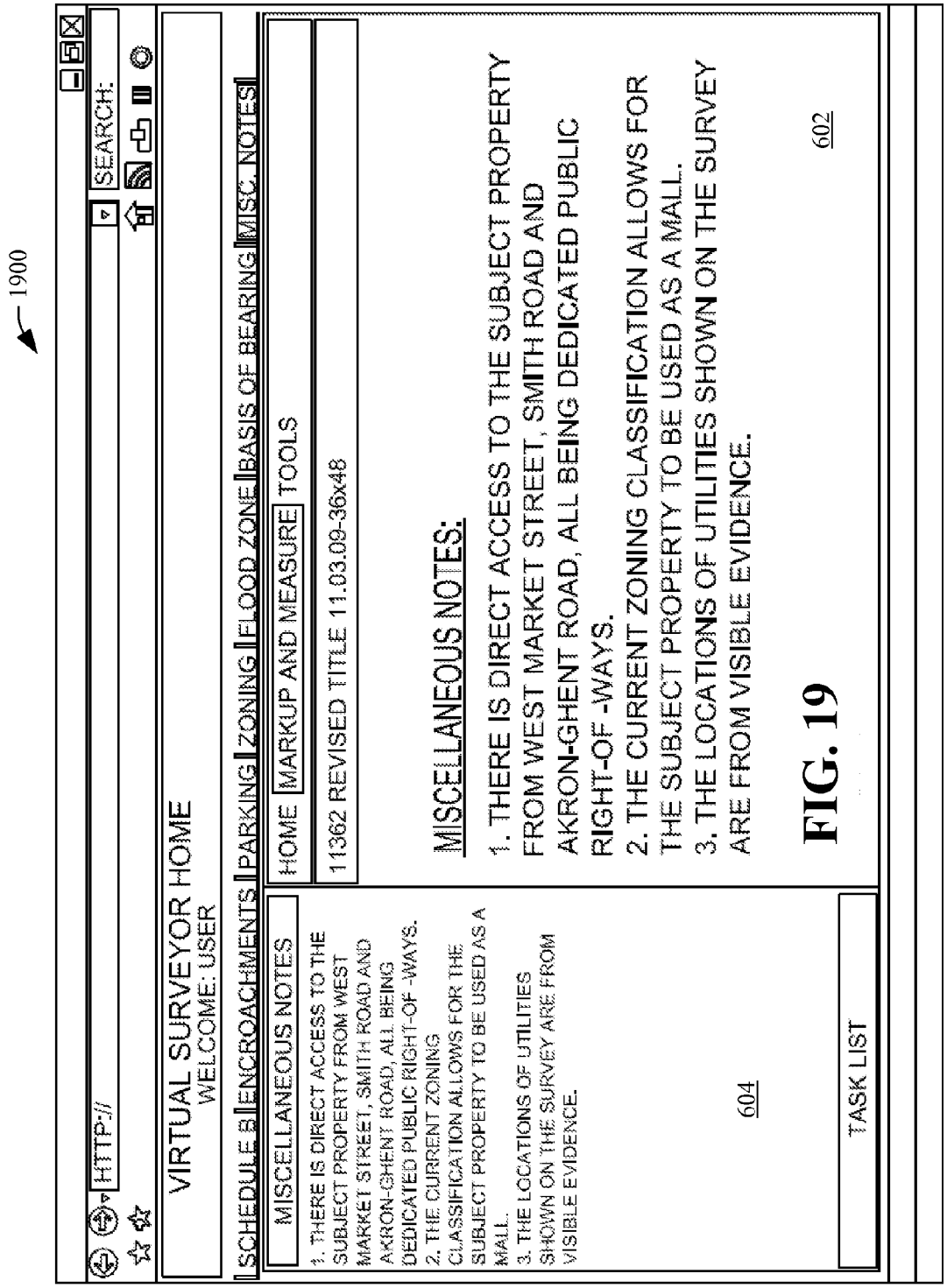

Referring now to FIG. 19, another exemplary screenshot 1900 of the graphical user interface is shown. In this example, the graphical user interface includes a selectable tab entitled "misc. notes". The user can select such tab, and responsive thereto the second window 604 is populated with text corresponding to miscellaneous notes in the land survey 114. Additionally, portions of such text may be displayed as being selectable, and upon the user selecting the text, the miscellaneous notes in the land survey 114 can be displayed prominently in the first window 602 as shown in the screenshot 1900. Alternatively, upon selecting the tab entitled "misc. notes", the view in the first window 602 can immediately alter to prominently display the miscellaneous notes in the land survey 114.

Returning again to FIG. 1, in yet another example, the second data 106 can comprise data describing a site map in the land survey 114. The relationship data 108 can relate text describing the site map with a visual depiction of the site map in the land survey 114. The display component 112 can cause a portion of the related data 106 to be displayed as a selectable graphical item. The interface component 120 can receive a user selection of the selectable graphical item, which is representative of the site map. Responsive to the interface component 120 receiving the user selection, the display component 112 can cause a view of the land survey 114 to alter to prominently display site map in the land survey 114. Additionally or alternatively, the related data 116 may include a selectable graphical item that corresponds to an aerial photograph. The interface component 120 can receive an indication that the user has selected the selectable graphical item, and the display component 112 can cause the photograph to be displayed on the display 118 to the user. Such aerial photograph may be displayed in a separate window and/or in the window corresponding to the related data 116 and/or the window corresponding to the land survey 114. Furthermore, a web-based mapping application may be accessed and utilized to provide the aerial photograph.

Figure 20:
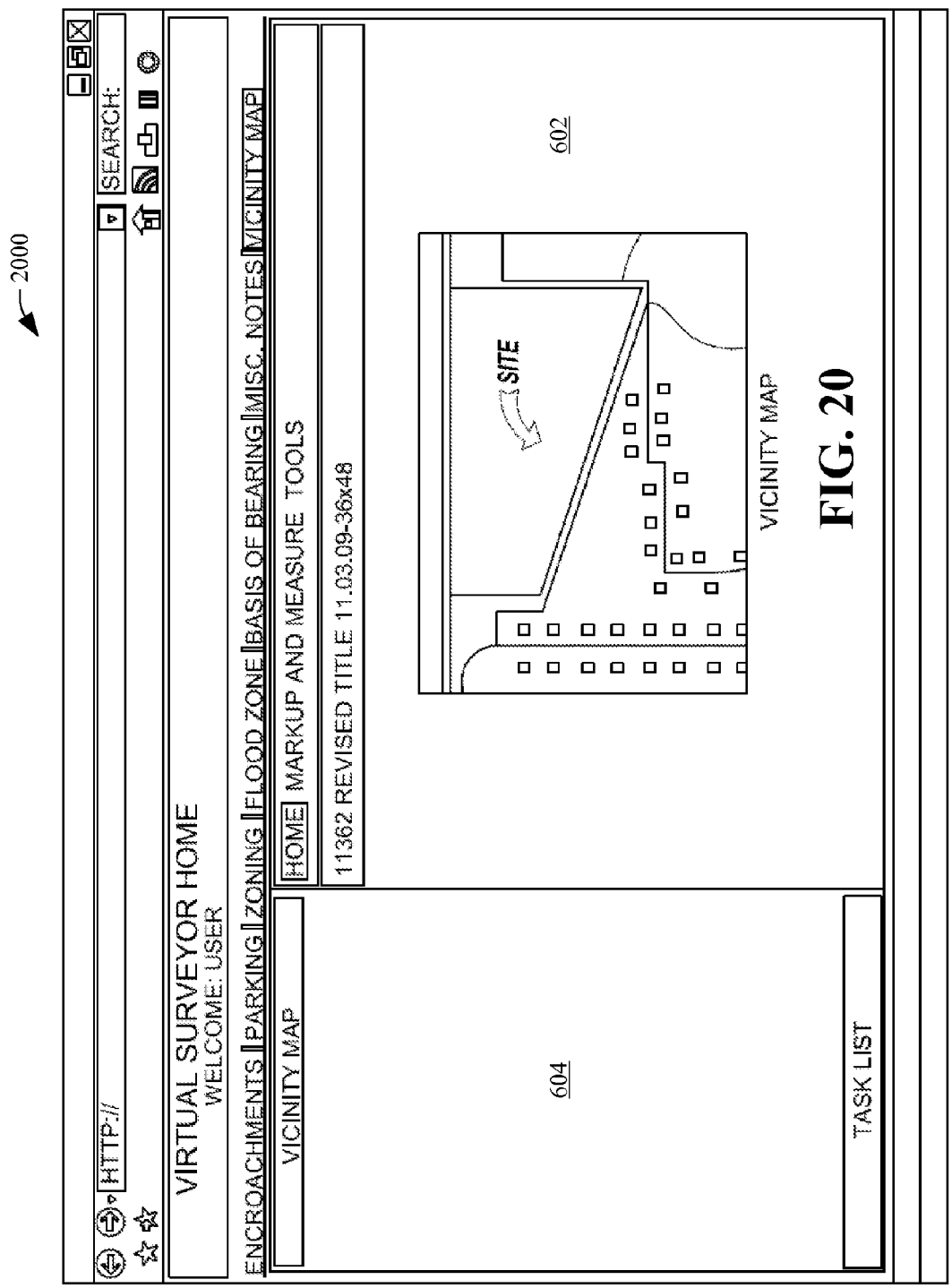

Referring to FIG. 20, an exemplary screenshot 2000 of the graphical user interface is illustrated, wherein the screenshot 2000 depicts display of a vicinity map in the land survey 114 to the user. In the exemplary screenshot 2000, the user has selected a tab entitled "vicinity map". Responsive to the user selecting such tab, the first window 602 is configured to display the vicinity map in the land survey 114 prominently. Typically, certain types of surveys, such as ALTA surveys, include a vicinity map thereon that shows where the parcel(s) included in the land survey 114 are with respect to a larger area (e.g., a block, a portion of a township, etc.). Upon selecting the tab entitled "vicinity map", the view of the land survey 114 in the first window 602 can alter to prominently display the vicinity map in the land survey 114 to the user.

Figure 21:
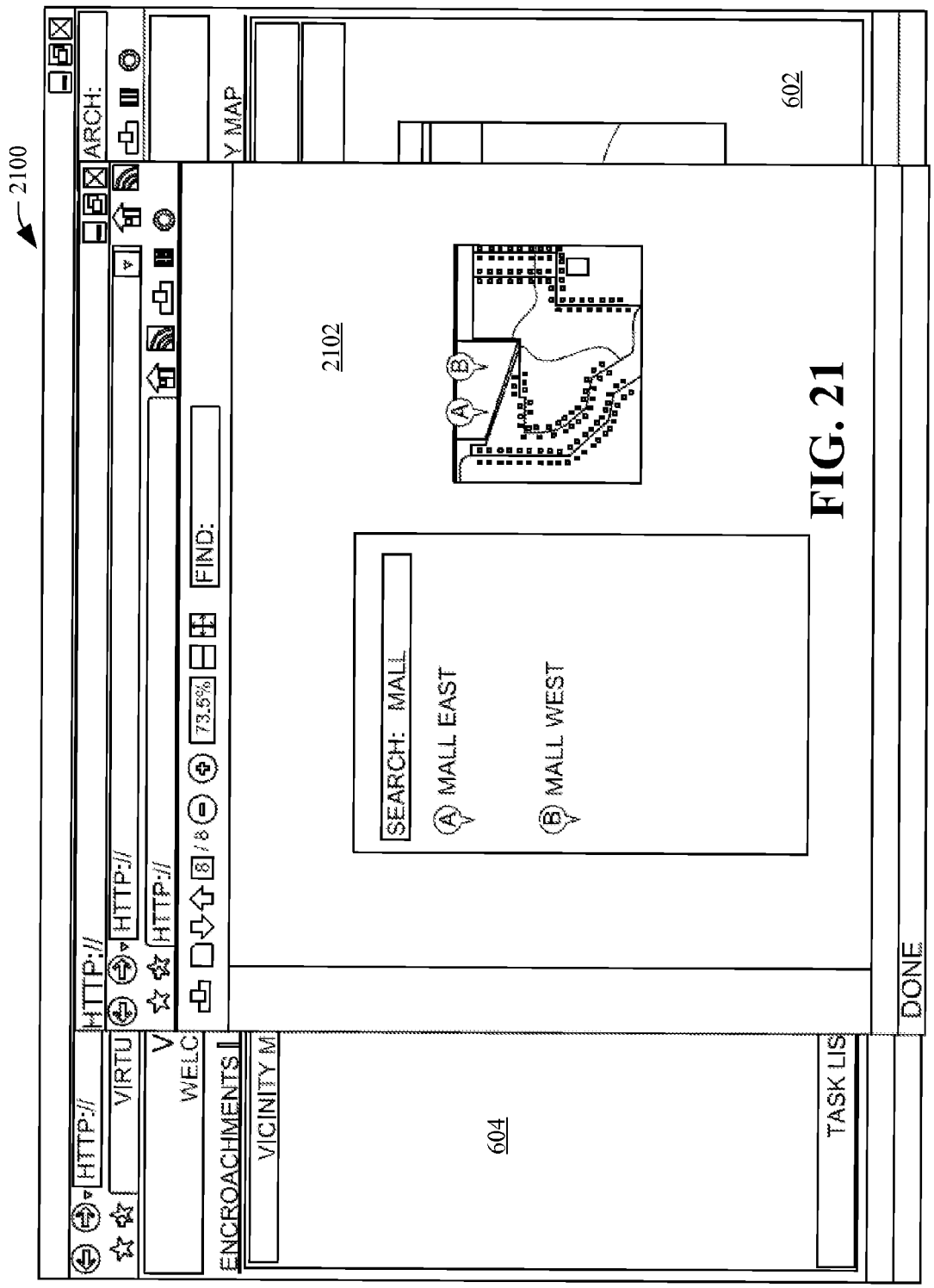

With reference now to FIG. 21, another exemplary screenshot 2100 of the graphical user interface is presented, wherein the screenshot 2100 illustrates display of an aerial photograph to the user. In the exemplary screenshot 2100, the user has selected the tab "vicinity map", and responsive thereto, the second window 604 can be populated with a selectable graphical item, which may be hyperlinked text, an image, a button, or the like. The user may then select such hyperlink, and an aerial photograph of the land corresponding to the land survey 114 can be presented to the user. This aerial photograph, as mentioned above, can be displayed in the first window 602, the second window 604, or in another window 2102. In a particular example, selection of the link can cause data to be sent to an online mapping service, and the online mapping service can provide the aerial photograph to the user by way of an Internet browser upon receipt of such data. For instance, the data can be an address, a geographic location (e.g., latitude/longitude coordinates), etc.

With respect again to FIG. 1, in still yet another example, the second data 106 can comprise data describing a title block in the land survey 114. The relationship data 108 can relate text describing the title block with a visual depiction of the title block in the land survey 114. The display component 112 can cause a portion of the related data 106 to be displayed as a selectable graphical item. The interface component 120 can receive a user selection of the selectable graphical item, which is representative of the title block. Responsive to the interface component 120 receiving the user selection, the display component 112 can cause a view of the land survey 114 to alter to prominently display the title block in the land survey 114.

Figure 22:
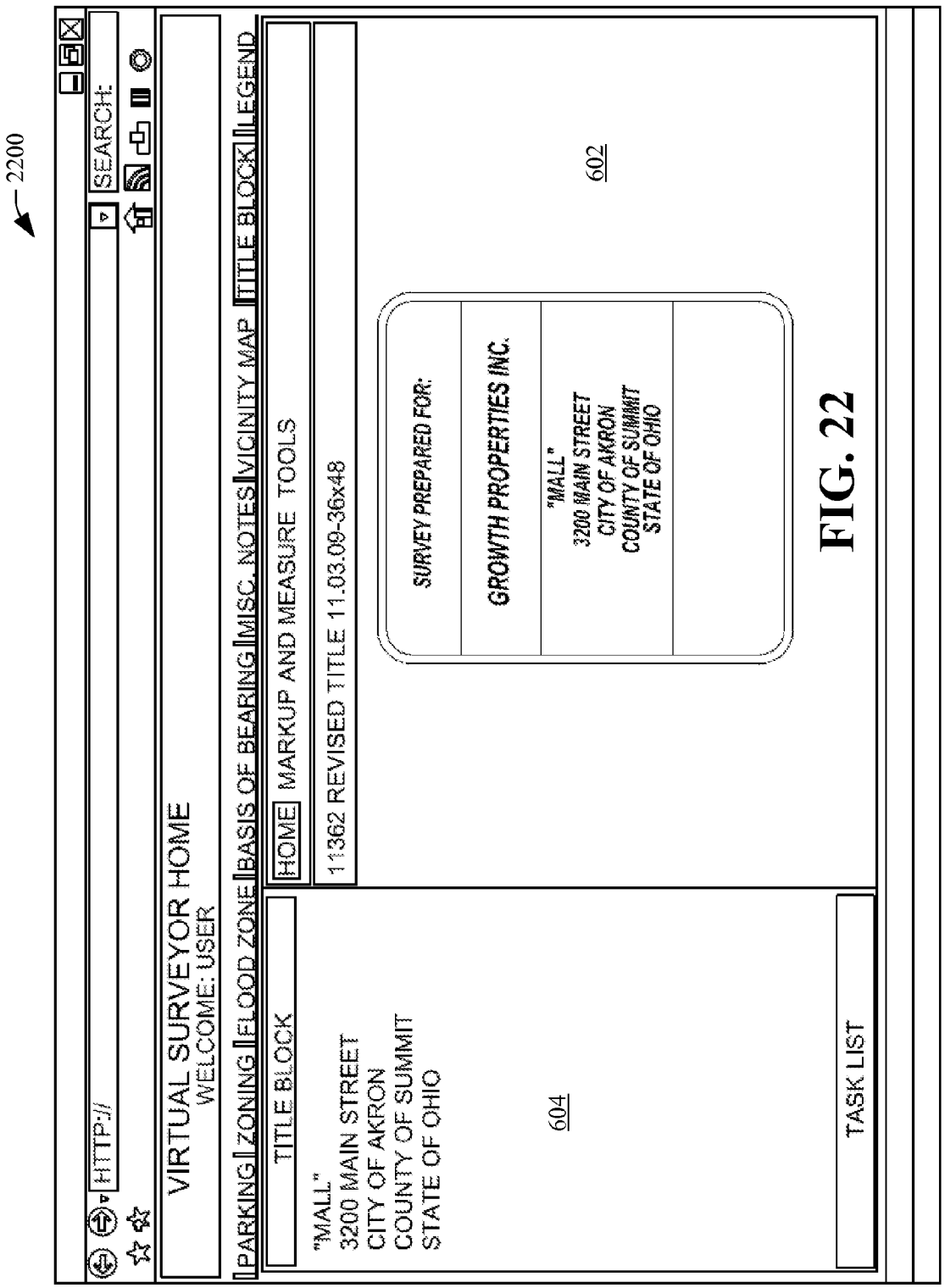

Turning briefly to FIG. 22, an exemplary screenshot 2200 of the graphical user interface is illustrated, wherein the screenshot 2200 depicts display of a title block to a user. In this exemplary screenshot 2200, the user has selected a tab entitled "title block", and responsive thereto text from the title block in the land survey 114 is shown in the second window 604. Additionally, responsive to the user selecting the aforementioned tab, the view shown in the first window 602 is altered to prominently display the title block in the land survey 114. Thus, upon selecting the tab entitled "title block", the title block in the land survey 114 can be prominently displayed to the user, rather than the user having to search through a paper copy of the land survey for the title block.

Returning again to FIG. 1, the second data 106 can additionally or alternatively comprise data describing a legend shown in the land survey 114. The legend can include a plurality of symbols that correspond to certain types of items. The relationship data 108 can relate text describing contents of the legend with items in the land survey 114. The display component 112 can cause a portion of the related data 106 to be displayed as a selectable graphical item. The interface component 120 can receive a user selection of the selectable graphical item, which is representative of an item in the legend that can be found in the land survey 114. Responsive to the interface component 120 receiving the user selection, the display component 112 can cause a view of the land survey 114 to alter to prominently display the item in the land survey 114. Such item may be a manhole cover, a telephone pole, a utility line, or other item that may be included in a legend. Additionally or alternatively, the display component 112 can cause the legend itself in the land survey 114 to be prominently displayed.

In another example, the second data 106 can comprise underground utilities located on the parcel(s) shown in the land survey 114. The relationship data 108 can relate text describing at least one underground utility with visual depictions of the at least one underground utility in the land survey 114. The display component 112 can cause a portion of the related data 106 to be displayed as a selectable graphical item. The interface component 120 can receive a user selection of the selectable graphical item, which is representative of the at least one underground utility found on the parcel(s). Responsive to the interface component 120 receiving the user selection, the display component 112 can cause a view of the land survey 114 to alter to prominently display the underground utility in the land survey 114. Additionally or alternatively, the display component 112 can cause the underground utility to be highlighted, such as shown in a prominent color. Furthermore, the related data 116 may include a selectable graphical item that corresponds to an underground utility, such as easement data, etc. The interface component 120 can receive an indication that the user has selected the selectable graphical item, and the display component 112 can cause the easement data to be displayed on the display 118 to the user. Such easement data may be displayed in a separate window and/or in the window corresponding to the related data 116 and/or the window corresponding to the land survey 114.

Figure 23:
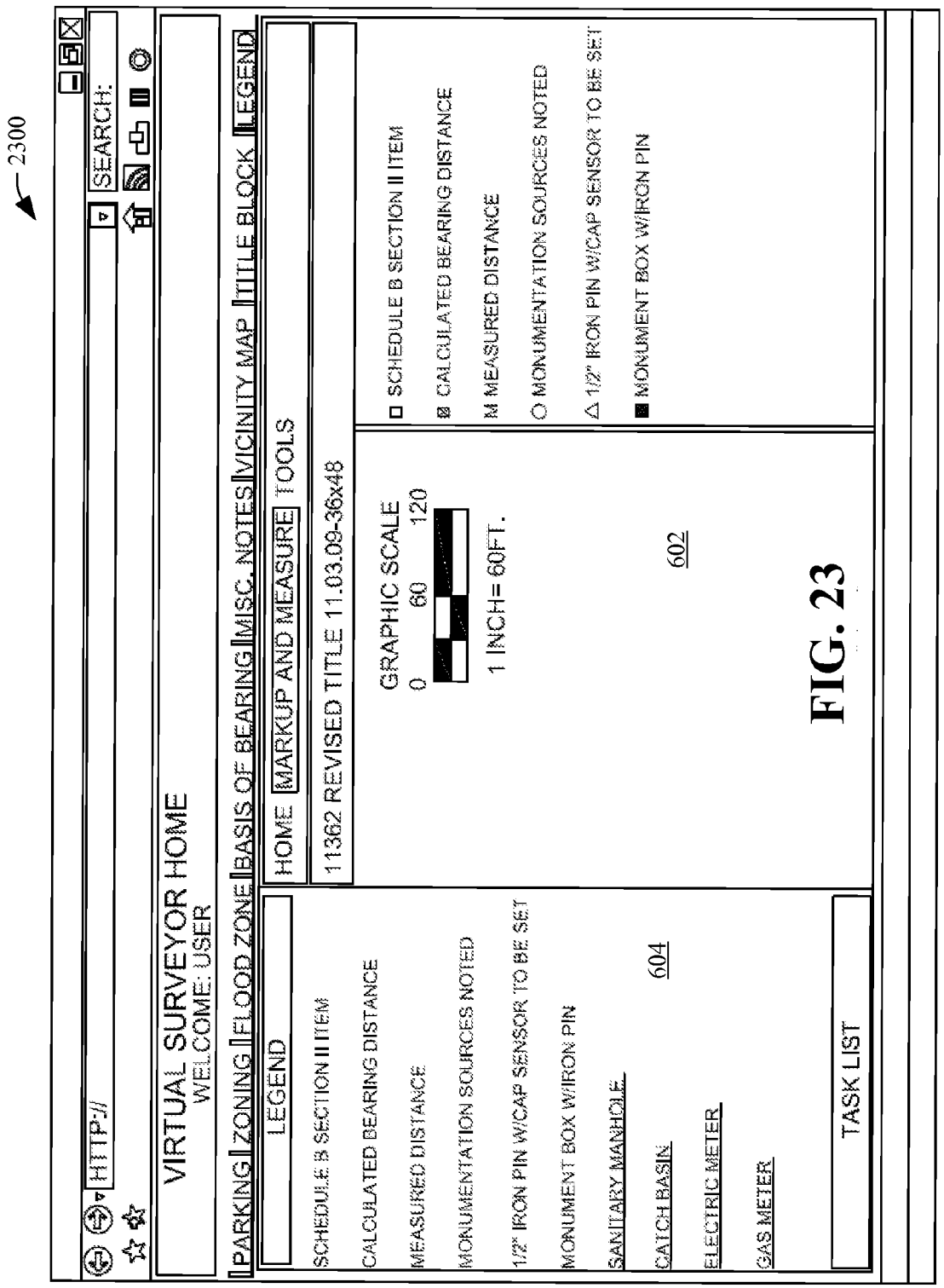

With reference now to FIG. 23, an exemplary screenshot 2300 of the graphical user interface is depicted, wherein the screenshot 2300 displays presentation of a legend of the land survey 114 to the user. In this exemplary screenshot 2300, the user has selected a tab entitled "legend", and responsive thereto the view of the land survey 114 in the first window 602 is altered to prominently display the legend in the land survey 114 to the user. Additionally, responsive to the user selecting the tab entitled "legend", the second window 604 can be populated with text pertaining to the legend, including at least some selectable text. Such selectable text can correspond to data depicted in the land survey 114.

Figure 24:
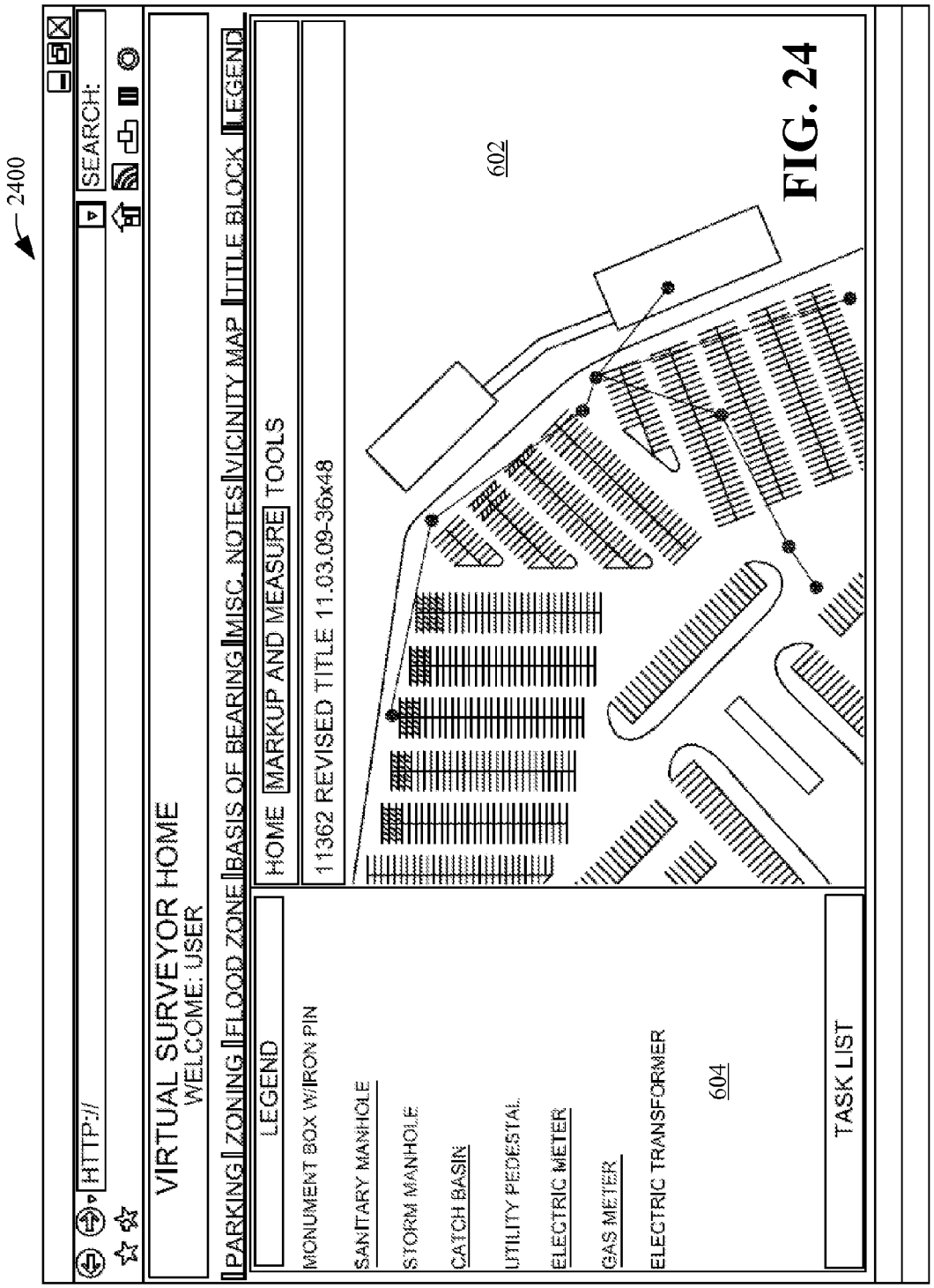

Turning to FIG. 24, another exemplary screenshot 2400 of the graphical user interface is depicted, wherein the screenshot 2400 illustrates display of certain objects in the land survey 114 to the user. In this screenshot 2400, the user has selected the tab "legend", and the second window 604 has been populated with text corresponding to the legend of the land survey 114. At least some of text is selectable, wherein the text can correspond to entities that can be found in the land survey 114, such as manhole covers, catch basins, telephone poles, and the like. In the exemplary screenshot 2400, the user has the text "sanitary manhole cover", and the view of the land survey 114 in the first window 602 is altered to prominently display the manhole covers shown in the land survey 114 to the user. Furthermore, such manhole covers (or other entity selected by the user in the second window 604) can be display in a certain color such that they are distinctive to the user.

Returning again to FIG. 1, in yet another example, the second data 106 can comprise data pertaining to a surveyor certification shown in the land survey 114. The relationship data 108 can relate text describing the surveyor certification with visual depictions of the surveyor certification in the land survey 114. The display component 112 can cause a portion of the related data 106 to be displayed as a selectable graphical item. The interface component 120 can receive a user selection of the selectable graphical item, which is representative of the surveyor certification. Responsive to the interface component 120 receiving the user selection, the display component 112 can cause a view of the land survey 114 to alter to prominently display the surveyor certification in the land survey 114.

Figure 25:
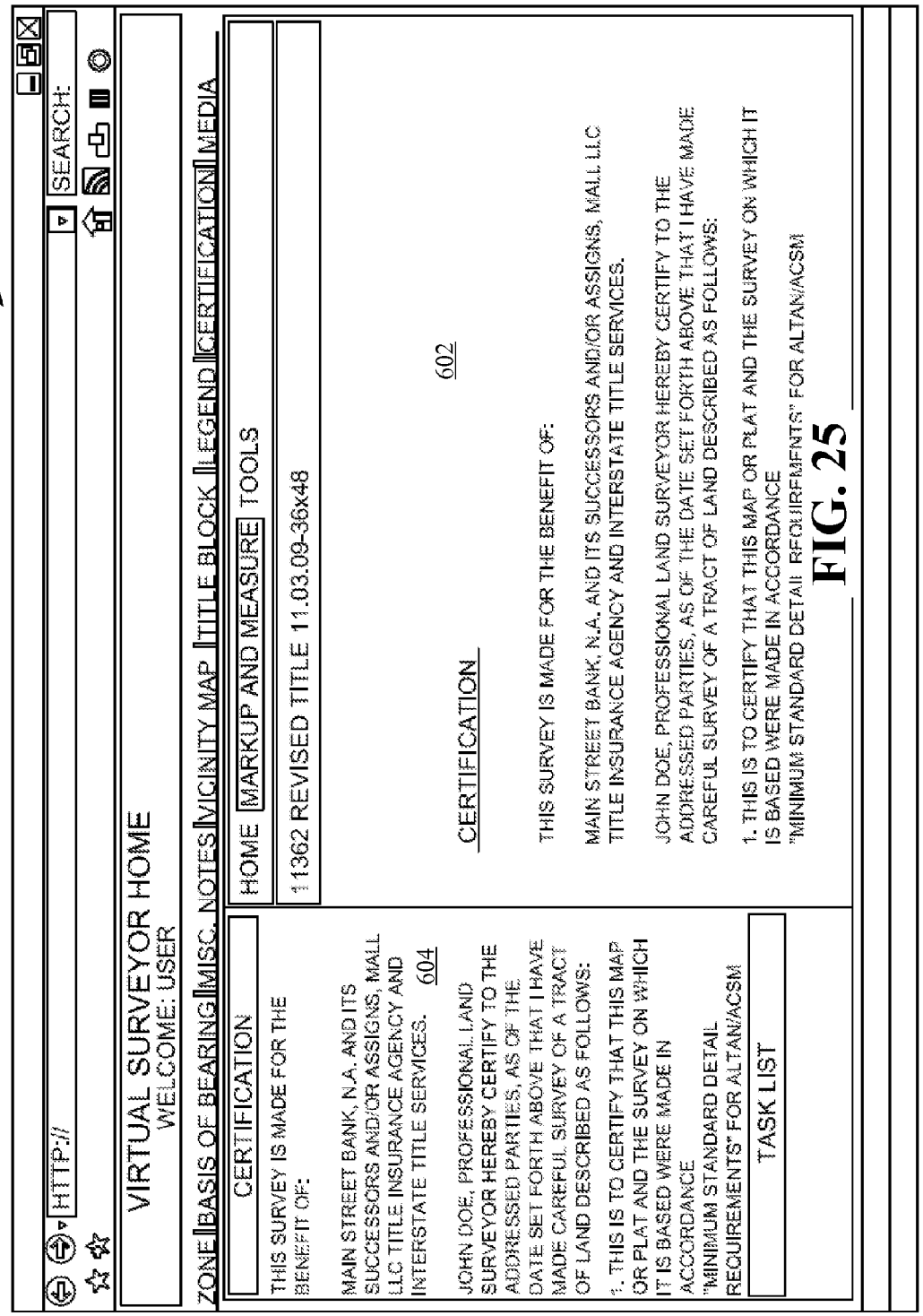

Turning to FIG. 25, an exemplary screenshot 2500 of the graphical user interface is shown, wherein the screenshot 2500 shows presentation of a survey certification to the user. In the screenshot 2500, the user has selected a tab entitled "certification", and responsive thereto text from the certification on the land survey 114 is displayed in the second window 604. Additionally, the view of the land survey 114 can be altered in the first window such that the certification of the land survey 114 is prominently displayed to the user.

Returning again to FIG. 1, in yet another example, the second data 106 can comprise multimedia data pertaining to one or more parcel(s) shown in the land survey 114. The relationship data 108 can relate a certain portion of the land survey 114 with the related data 116 (the multimedia data). The display component 112 can cause a portion of the related data 106 to be displayed as a selectable graphical item. Moreover, the display component 112 can cause a selectable graphical item to be displayed in the land survey 114. The interface component 120 can receive a user selection of at least one of the selectable graphical items (either the selectable graphical item in the related data 104 or the selectable graphical item in the land survey 114). Responsive to the interface component 120 receiving the user selection, the display component 112 can cause the multimedia data to be displayed to the user. This multimedia data may be an image of a certain of the parcel(s) shown in the land survey 114, a video of the certain portion of the parcel(s) shown in the land survey 114, an audio file describing the certain portion of the parcel(s) shown in the land survey, etc. Furthermore, upon the user selecting the selectable graphical item in the related data 106, the display component 112 can cause display of a graphical item corresponding to the multimedia item to be prominently displayed in the land survey 114.

Figure 26:
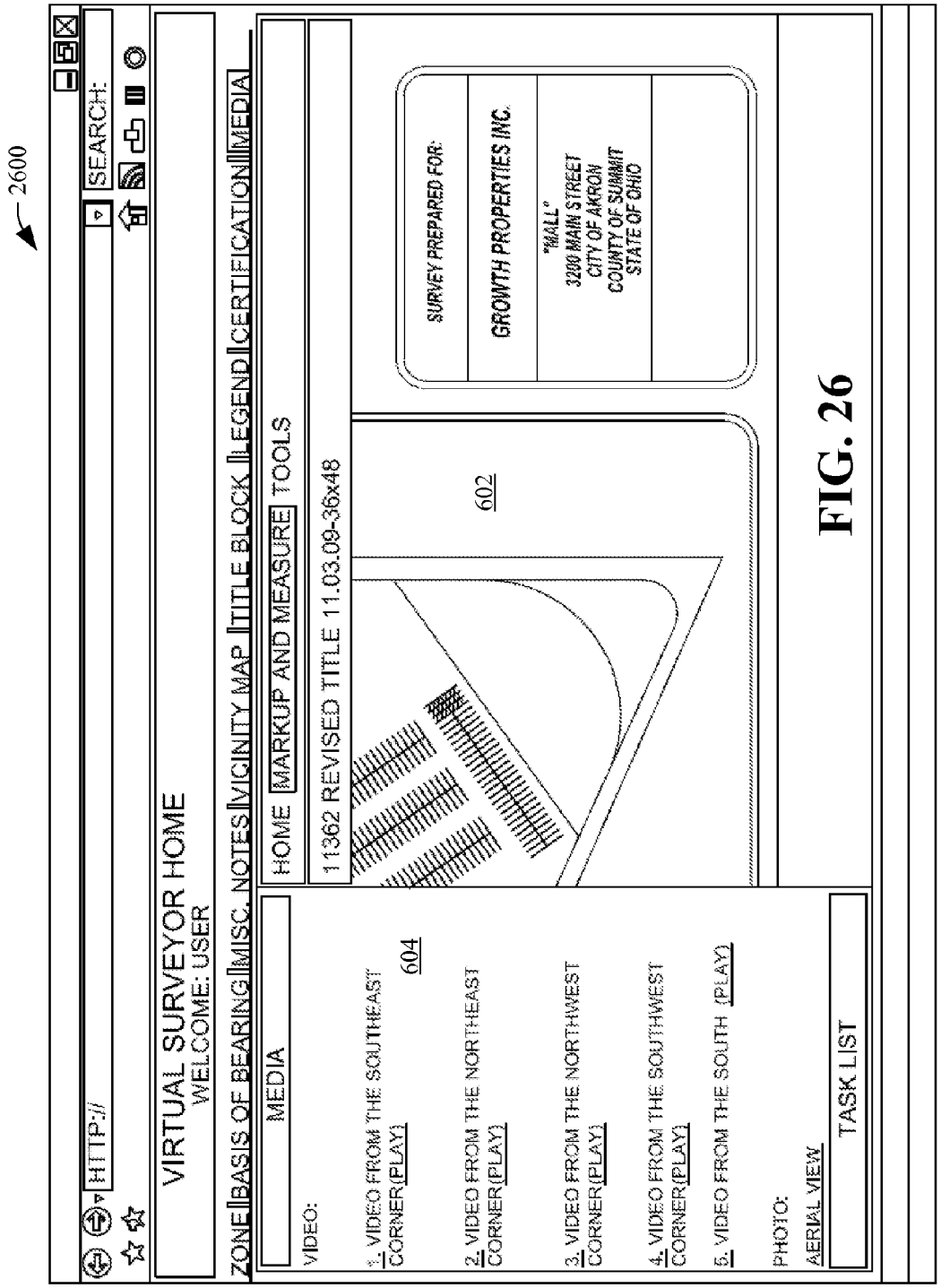

Referring now to FIG. 26, an exemplary screenshot 2600 of the graphical user interface is illustrated, wherein the screenshot 2600 depicts display of multimedia data pertaining to the land survey 114. In this exemplary screenshot 2600, the user has selected a tab entitled "media", and responsive thereto the second window 604 is populated with text that describes media (multimedia) that is related to the land survey 114 shown in the first window 602. As can be ascertained, such text can describe video corresponding to the land survey 114, images corresponding to the land survey 114, audio files corresponding to the land survey 114, etc. Moreover, responsive to the user selecting that aforementioned tab, the view of the land survey 114 shown in the first window can be altered to prominently display certain portions of the land survey 114 that have media corresponding thereto. At least some of the text shown in the second window 604 is selectable, wherein selection of the text can cause the media pertaining to such text to be displayed to the user. Additionally, while not shown, the land survey 114 as shown in the first window 602 can comprise selectable icons pertaining to multimedia, such that the user can select such icons directly in the first window 602 and cause the multimedia to be presented to the user.

Figure 27:
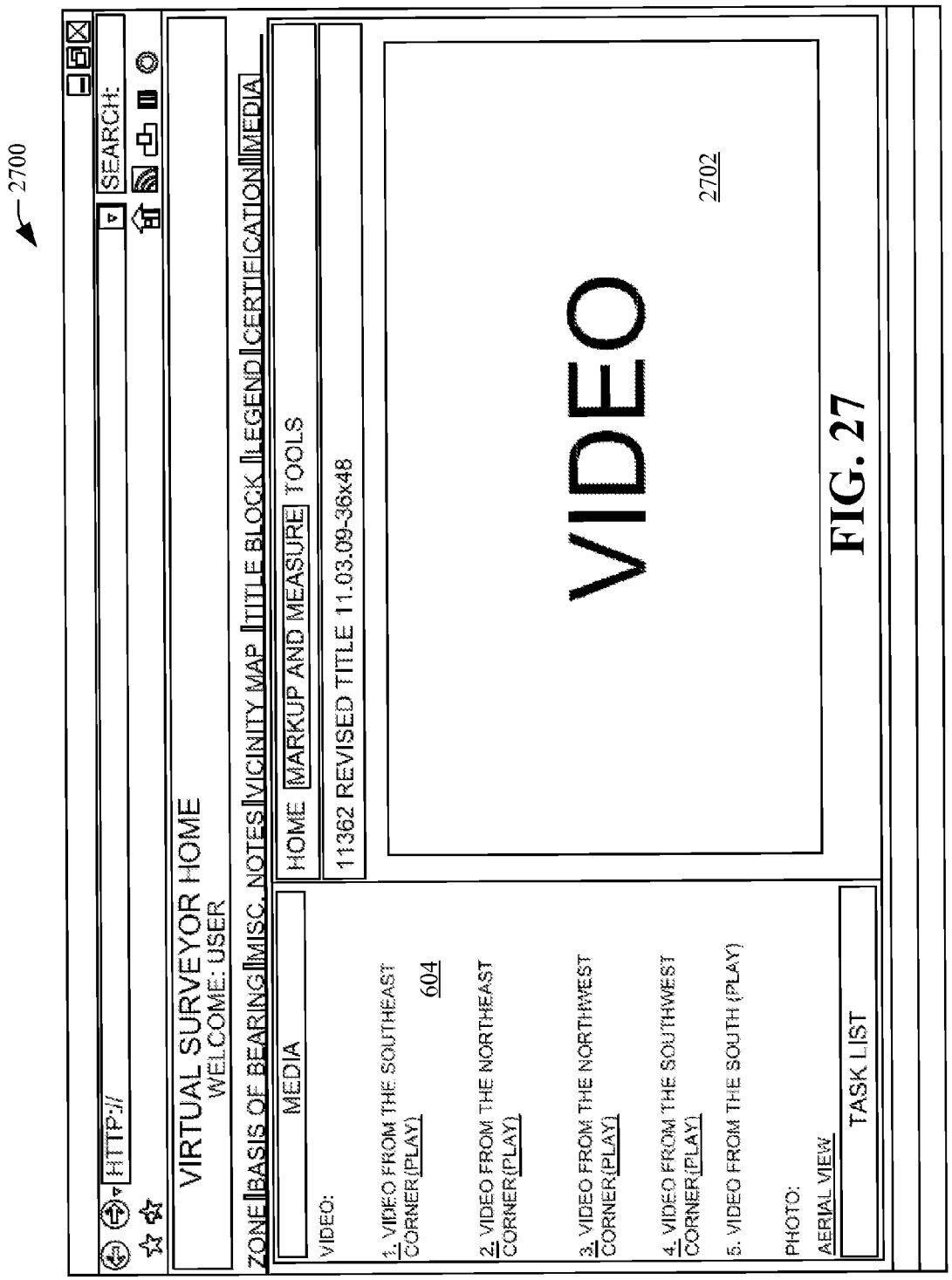

Referring now to FIG. 27, an exemplary screenshot 2700 of the graphical user interface is shown, wherein the screenshot 2700 illustrates display of video pertaining to the land survey 114 to the user. In this screenshot 2700, the user has selected the tab entitled "media", and has thereafter selected some selectable text in the second window 604. Responsive to the user selecting the selectable text (e.g., text corresponding to a video file), appropriate media can be displayed to the user.

The graphical user interface can support native display of the media on one of the first window 602 or the second window 604, or the media can be presented in an appropriate application interface 2702 and displayed to the user therein.

Turning again to FIG. 1, the apparatus 100 can be configured to accept user comments with respect to any suitable type of related data. As will be shown below, the user can select a particular type of the related data 116, and may then choose to provide comments with respect to that type of related data. After providing comments, the apparatus 100 can be configured to transmit such comments in an electronic format, such as by way of email, text message, instant message, or some other form of electronic communication. The electronic message can be transmitted to an account of an intended recipient, such as an email address. Furthermore, the electronic message can be transmitted to a distribution list. A transmitter component (not shown) can be configured to transmit the message in the electronic format as instructed by the user.

Referring now to FIG. 28, an exemplary screenshot 2800 of the graphical user interface is illustrated, wherein such screenshot 2800 depicts insertion and transmission of user-generated comments with respect to one or more of the tabs described previously. For example, a screen such as that depicted in the screenshot 2800 can be presented to the user upon the user selecting a tab entitled "comments", upon the user utilizing a pulldown menu and selecting a particular menu item, and/or the like. As can be ascertained, the graphical user interface can include a table 2802, wherein a first column of the table 2802 pertains to the selectable tabs, the second column of the table 2802 pertains to a certain task, a third column of the table 2802 includes check boxes that allow the user to indicate that a certain task has been completed, and a fourth column of the table 2802 includes a fillable field where the user can enter comments pertaining to content of one or more of the other columns of the table 2802. Additionally, the graphical user interface can include a button 2804 that can initiate transmission of the table 2802 and/or information therein to a particular user. For example, the user can select the button 2804, and subsequent thereto an email message can be automatically generated and transmitted to a predetermined email address.

Referring back to FIG. 1, portions of the apparatus 100 may be configured to execute on a server that is accessible to a user through utilization of a web browser. For example, the user can type in a particular URL to a browser, and be directed to a web page corresponding to the apparatus 100. The user may provide a username and password (or some other data to authenticate to the apparatus 100), and the apparatus 100 can operate as a web service to the user. Alternatively, the apparatus 100 may be installed as an application that executes solely on a client computing device.

In several examples provided above, certain portions of the land survey are described as being "displayed prominently." This can refer to the display component 112 centering a current view around an item corresponding to a selected graphical item. Furthermore, "displayed prominently" can refer to altering a zoom level such that the item corresponding to the selected graphical item is shown at a "zoomed-in" level in the land survey 114.

Moreover, the apparatus 100 can be configured to perform actions that have not been shown in the screenshots depicted in FIGS. 6-28. For example, the apparatus 100 can be configured to compute closure information for a land survey. More specifically, a surveyor or other entity can provide the interface component 120 with calls from a legal description or survey, and the interface component 120 can compute and output closure information to the 118. Moreover, the graphical user interface can be configured with additional tabs, such as but not limited to a tab pertaining to a final survey, wherein a final survey in image form (which can be signed and sealed) may be presented on the display 118 to the user when the user selects such a tab. Another tab that may be optionally included can correspond to land area, wherein selection of such a tab can cause the first window to be zoomed to display the portion of the land survey 114 that describes the land area (e.g., square footage and acreage in a highlighted manner) and the second window can display text corresponding to the land area. Still another exemplary tab may be a tab pertaining to access to a parcel, wherein selection of such can cause the second window to display text relating to an access note. Furthermore, a selectable icon can be displayed in the second window 604, and upon selection thereof by the user the corresponding features in the land survey 114 can be highlighted (e.g., displayed in a distinctive color).

Still further, as mentioned above, the apparatus 100 can be comprised by a server, and such server can be accessed by multiple parties. Thus, various parties can review the survey through utilization of the apparatus 100, and in one example multiple parties can review the survey through utilization of the apparatus 100 at the same time (e.g., all parties but one may have "read only" privileges).

Additionally, the first window 602 can display certain particular portions of the land survey 114 upon the user selecting tabs. For instance, the land survey 114 can be automatically zoomed to a particular location of the land survey 114 corresponding to a selected tab.

Additionally, while the screenshots provided herein illustrate interaction in separate windows, it is to be understood that the claims are intended to encompass the implementation where drawings are modified to include hyperlinks, and selection of such hyperlinks can cause a view of the land survey to automatically change and/or can cause text/content of the land survey to change color, change font, change line weight, and/or the like.

Figure 2:
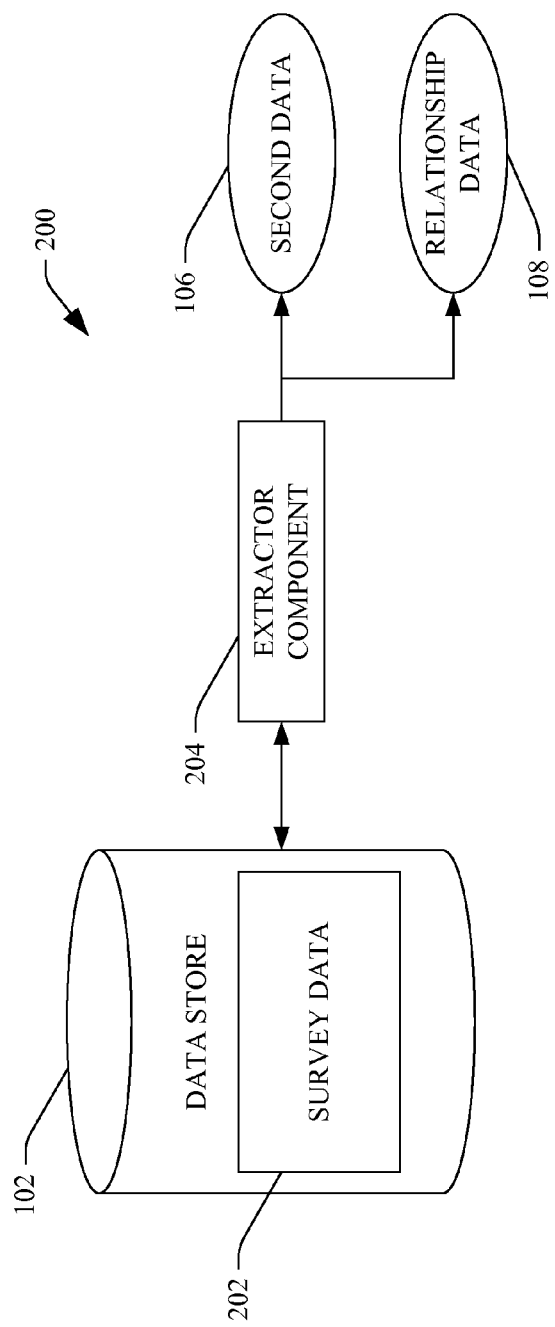
FIG. 2 is a functional block diagram of an exemplary apparatus that facilitates extracting data from a computer-readable land survey.

Turning now to FIG. 2, an exemplary apparatus 200 that facilitates generating the second data 106 and the relationship data 108 is illustrated. The apparatus 200 comprises the data store 102, which includes survey data 202. The survey data 202 can be data entered into a survey drawing application, such as AutoCAD® or other suitable application. Furthermore, the survey data 202 can comprise metadata that describes portions of a land survey. For instance, the metadata can indicate that certain text in the survey is a legal description, a description of an easement, a description of a flood zone, and the like. Additionally, the metadata can indicate that certain shapes in the survey (lines, circles, etc.) represent particular entities (boundary lines, easement lines, manholes, etc.).

The apparatus 200 further comprises an extractor component 204 that is configured to extract text from the survey data 202 and further extract metadata from the survey data 202 that describes extracted text and relationships between extracted text and entities. Based upon the relationships indicated in the metadata, the extractor component 204 can generate the second data 106 (text extracted from the survey data 202) and the relationship data 108 (data that describes relationships between the second data 106 and portions of the land survey 114). Furthermore, the survey data 202 can comprise multimedia data, images, scanned documents, etc., and the extractor component 204 can analyze metadata extracted from the survey data 202 to find relationships between text extracted from the survey data 202 and the multimedia data, images, scanned documents, etc. If no relationship exists, the extractor component 204 can classify such multimedia data, images, etc. as being of a particular type of related data, such that links to these types of documents can be provided for selection together with other data of the certain type.

Pursuant to an example, the survey data 202 can be arranged in accordance with a particular schema, such that the extractor component 204 can analyze contents of the schema and extract text and recognize relationships based at least in part upon analysis of the schema. Other manners for organizing data and extracting data are contemplated and are intended to fall under the scope of the hereto-appended claims.

Figure 3:
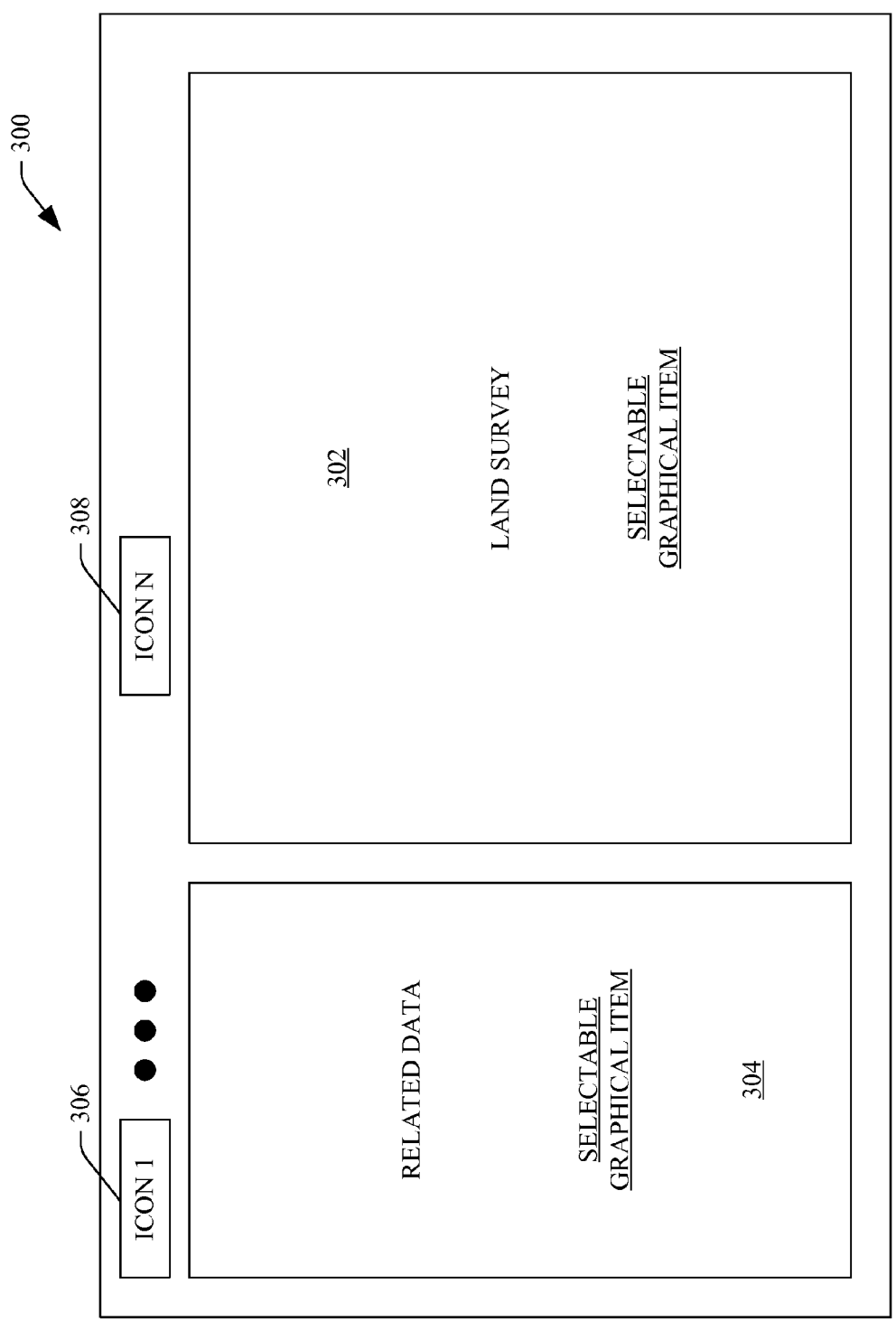
FIG. 3 is an exemplary graphical user interface that facilitates reviewing a land survey and documentation related thereto.

With reference now to FIG. 3, an exemplary graphical user interface 300 that facilitates displaying a land survey and data related thereto is illustrated. The graphical user interface 300 comprises a first window 302 that is configured to display a land survey to a user and a second window 304 that is configured to display data related to the land survey to the user.

The graphical user interface 300 also comprises a plurality of selectable graphical items 306-308, wherein each of the graphical items 306-308 corresponds to a certain type of related data. As described above, the different types of related data include, but are not limited to, data typically found in Schedule A of a title report (including legal description of a parcel), data typically found in Schedule B of a title report (such as easements pertaining to a parcel shown in the land survey), data pertaining to encroachments found on a parcel shown in the land survey, data pertaining to parking spaces shown in the land survey, data pertaining to zoning of parcels shown in the land survey, flood zone data, data pertaining to a basis of bearing used in the land survey, data pertaining to miscellaneous notes for one or more parcels shown in the land survey, data pertaining to a vicinity map shown in the land survey, data pertaining to a surveyor certification shown in the land survey, data pertaining to a title block shown in the land survey, data pertaining to a legend of the land survey, multimedia data pertaining to a portion of at least one parcel shown in the land survey, amongst other types of related data. Thus, selection of one of the graphical items causes related data corresponding thereto to be displayed in the second window 304.

After a type of related data has been selected, a portion of such related data can be shown as a selectable graphical item (such as a hyperlink) in the second window 304. In a first example, selection of the selectable graphical item in the first window 304 can cause a relationship between a portion of the related data and content of the land survey shown in the first window 302 to be visually displayed to a user. That is, a view of the land survey can be altered to prominently display a portion of the land survey that corresponds to a portion of the related data represented by the selectable graphical item. In another example, selection of the graphical item in the second window 304 can cause a document of the selected type to be displayed to the user, such as a legal description of boundaries of a parcel, a legal description of an easement, an environmental report, or the like. When the user wishes to review another type of data, the user can select an appropriate one of the graphical items 306-308. The second window 304 then displays that type of related data, together with graphical items that can be selected by the user pertaining to that type of data.

Additionally, the land survey shown in the first window 302 can comprise one or more selectable graphical items. Such selectable graphical items can operate similarly to what has been described previously. For instance, selection of the graphical item in the first window 302 can cause a corresponding portion of data in the second window 304 to be highlighted in some fashion. In another example, selection of the selectable graphical item in the first window 302 can cause a new window to appear that displays a document that pertains to the selected portion of the land survey 302. In a specific example, the selectable graphical item in the first window may be in the form of a selectable image of a camera, and selection of such image of the camera can cause an image or video of the parcel shown in the land survey at a certain perspective to be shown to the user.

Figure 4:
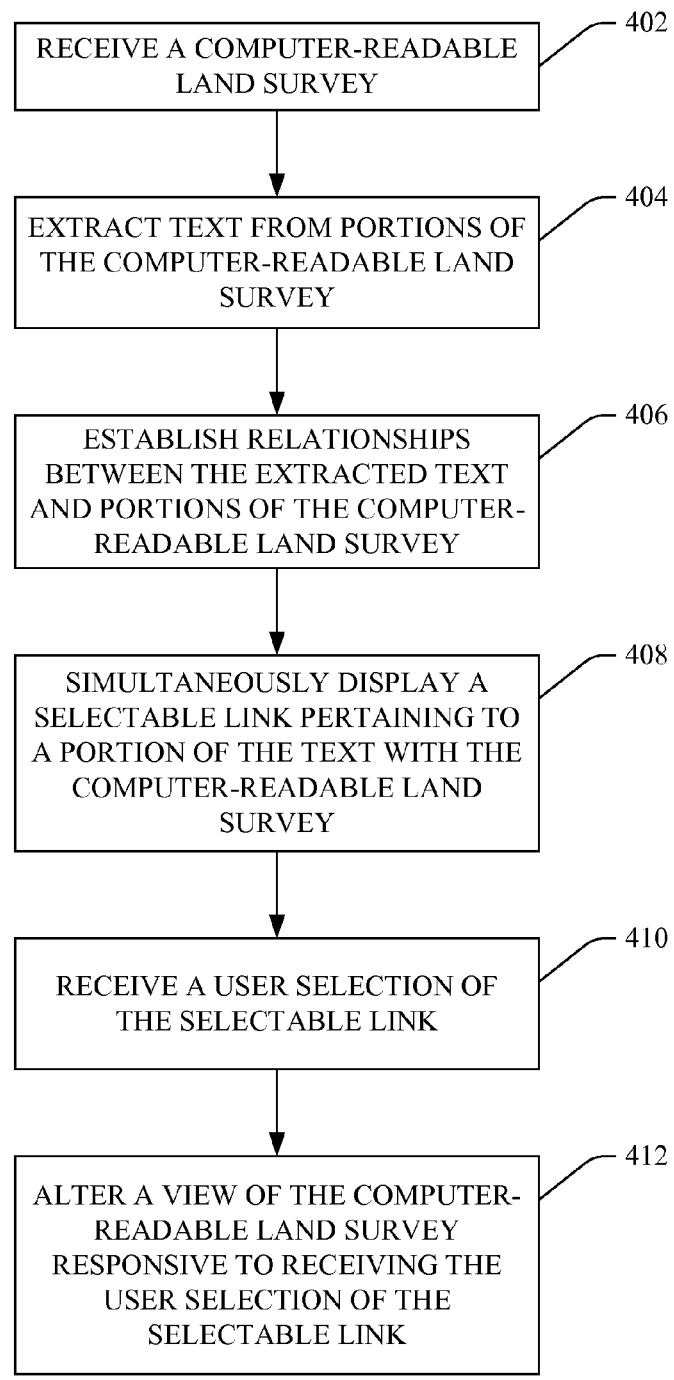
FIG. 4 is a flow diagram that illustrates an exemplary methodology for graphically relating data to a land survey.

With reference now to FIG. 4, an exemplary methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement the methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 4, a methodology 400 that facilitates providing a user with an instrument for analyzing charts (surveys) is illustrated. At 402, a computer-readable land survey is received. At 404, text is extracted from portions of the computer-readable land survey. Additionally, metadata describing such text (e.g., classifying the text) and relationships pertaining to the text can be extracted from the computer-readable land survey.

At 406, relationships between the extracted text and portions of the computer-readable land survey are established based at least in part upon the metadata extracted from the computer-readable land survey. At 408, a selectable link pertaining to a portion of the text is simultaneously displayed with the computer-readable land survey on a display screen of a computing device.

At 410, a user selection of the selectable link is received, and at 412 a view of the computer-readable land survey is altered responsive to receiving the user selection of the selectable link. The view can be altered to highlight a relationship between the portion of text corresponding to the selectable link and a portion of the land survey.

Figure 5:
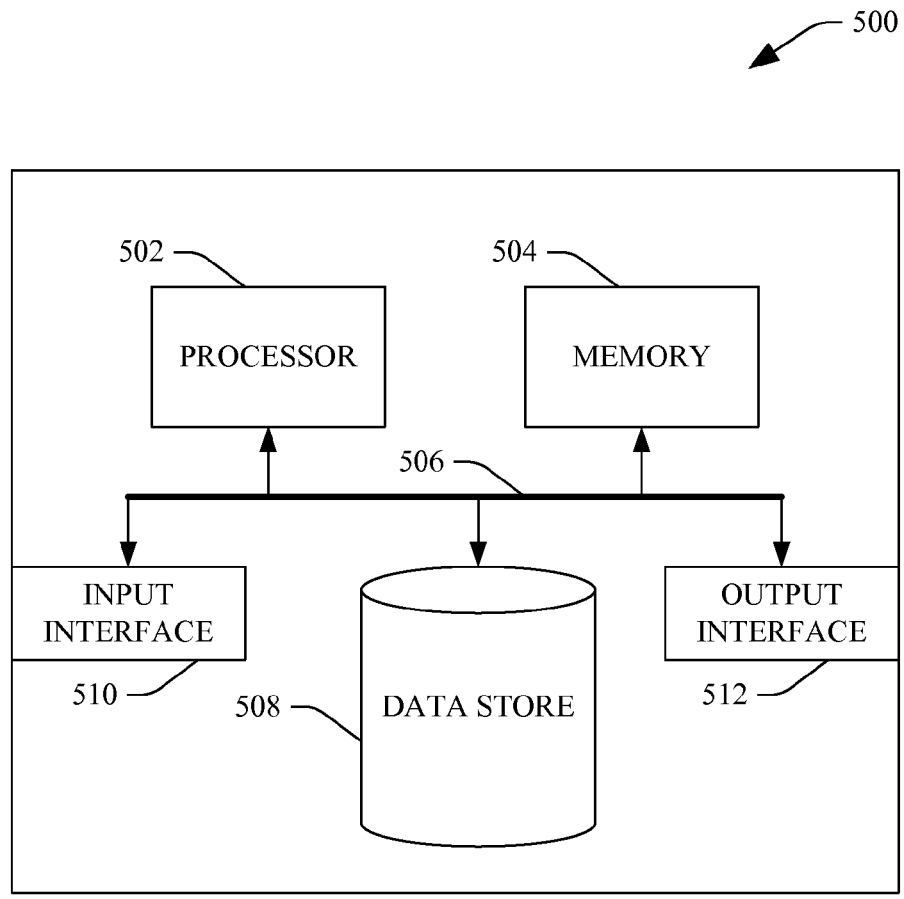
FIG. 5 is an exemplary computing system.

Now referring to FIG. 5, a high-level illustration of an example computing device 500 that can be used in accordance with the apparatuses and methodologies disclosed herein is illustrated. For instance, the computing device 500 may be used in an apparatus that supports analyzing charts/surveys. In another example, at least a portion of the computing device 500 may be used in an apparatus that supports extracting data from a computer-readable land survey. The computing device 500 includes at least one processor 502 that executes instructions that are stored in a memory 504. The memory 504 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 502 may access the memory 504 by way of an apparatus bus 506. In addition to storing executable instructions, the memory 504 may also store land-survey data, data related to the land survey, multimedia data, etc.

The computing device 500 additionally includes a data store 508 that is accessible by the processor 502 by way of the apparatus bus 506. The data store 508 may be or include any suitable computer-readable storage, including a hard disk, memory, etc. The data store 508 may include executable instructions, land survey data, images, video, scanned documents, relationship data, etc. The computing device 500 also includes an input interface 510 that allows external devices to communicate with the computing device 500. For instance, the input interface 510 may be used to receive instructions from an external computer device, data from an instrument, etc. The computing device 500 also includes an output interface 512 that interfaces the computing device 500 with one or more external devices. For example, the computing device 500 may display text, images, etc. by way of the output interface 512.

Additionally, while illustrated as a single apparatus, it is to be understood that the computing device 500 may be a distributed apparatus. Thus, for instance, several devices may be in communication by way of a network connection and may collectively perform tasks described as being performed by the computing device 500.

As used herein, the terms "component" and "apparatus" are intended to encompass hardware, software, or a combination of hardware and software. Thus, for example, an apparatus or component may be a process, a process executing on a processor, or a processor. Additionally, a component or apparatus may be localized on a single device or distributed across several devices. Furthermore, a component or apparatus may refer to a portion of memory and/or a series of transistors. Still further, a component may be configured with computer-executable instructions that cause the component to perform tasks described as being performed by such component.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. An apparatus that facilitates chart analysis with respect to a land survey and a corresponding legal description of boundaries depicted in the land survey, comprising:
   at least one processor; and
   a memory that comprises a plurality of components that are executable by the at least one processor, the components comprising:
   a receiver component that is operable to receive computer-readable data, wherein the computer-readable data comprises first data that is representative of a land survey of a particular type, wherein the land survey is a land survey of at least one parcel of land, wherein the computer-readable data further comprises second data that is representative of text of a legal description of the at least one parcel of land, wherein the computer-readable data further comprises third data that is representative of at least one encroachment of at least one item over a boundary line of the at least one parcel of land;
   a display component that is operable to process one or more of the first data or the second data to cause one or more of the land survey or the legal description to be graphically displayed on a display screen of a computing device to a user;

an interface component that is operable to recognize a selection of a portion of one of the land survey or the legal description by the user, wherein the display component is operable to graphically alter content depicted on the display screen to illustrate a correlation between the portion selected by the user and a corresponding portion of the unselected land survey or the legal description responsive to the interface component recognizing the selection of the portion of the land survey or the legal description;

wherein the at least one processor is operative responsive at least in part to the first data and the second data to cause the display component to output a first visible representation of the land survey and a second visible representation of the text of the legal description, wherein the second visible representation includes a plurality of visually distinct portions of the text of the legal description, wherein the plurality of visually distinct portions of the text of the legal description includes respective textual descriptions of different boundary lines displayed in the first visible representation;

wherein the interface component is operative to receive a selection of one of the visually distinct portions of the text of the legal description, which selected visually distinct portion is one of the textual descriptions of one of the boundary lines;

wherein the at least one processor is operative responsive at least in part to the selection to cause the display component to output an altered visible representation of the land survey in which a portion of the land survey that corresponds to the selected portion of the text of the legal description is relatively more visually distinctively highlighted compared to the visible representation of the corresponding portion of the land survey prior to being altered, so as to visually illustrate a correlation between the selected portion of the text of the legal description and the corresponding portion of the land survey, wherein the portion of the land survey that is relatively more visually distinctively highlighted in the altered visible representation of the land survey is a graphical depiction of the one boundary line that corresponds to the selection;

wherein the interface component is operative to receive a selection pertaining to the at least one encroachment, wherein the at least one processor is operative responsive at least in part to the selection pertaining to the at least one encroachment to cause the display component to output an altered visible representation of the land survey in which the at least one encroachment is relatively more visually distinctively highlighted compared to the visible representation of the corresponding portion of the land survey prior to being altered.

2. The apparatus of claim 1, wherein the type of the survey is one of a title survey, an American Land Title Association survey, a boundary survey, a tax map, or a plat.

3. The apparatus of claim 1, wherein the display component is operable to simultaneously display the land survey and the legal description in a graphical user interface.

4. The apparatus of claim 1, wherein the display component is operable to display portions of the legal description as being selectable, wherein the interface component recognizes that the user has selected a portion of the legal description displayed as being selectable, and wherein the display component is operable to highlight a portion of the land survey that corresponds to the selected portion of the legal description.

5. The apparatus of claim 1, further comprising an extractor component that is configured to extract the legal description of the parcel from the land survey, and wherein the display component is operable to cause the legal description to be displayed in a window separate from a window that is utilized to display the land survey.

6. The apparatus of claim 1, wherein the interface component is operable to recognize a selection by the user of a first link that corresponds to the legal description, and wherein the display component is operable to cause a document to be displayed to the user simultaneously with the land survey, wherein the document comprises a legal description provided by a title insurance company.

7. The apparatus of claim 1, wherein the interface component is operable to recognize a selection of the user of a first link that corresponds to a comment field, wherein the display component is operable to cause a text entry field to be presented to the user responsive to the interface component recognizing the selection of the user of the first link, wherein the text entry field is configured to receive a comment pertaining to the legal description, and wherein the comment pertaining to the legal description is displayed simultaneously with the survey.

8. The apparatus of claim 1, wherein the interface component is operable to recognize a selection of a user of a first link that corresponds to a comment field, wherein the display component is operable to cause a text entry field to be presented to the user on the survey, wherein the text entry field is configured to receive a comment pertaining to a portion of the land survey, and wherein the display component is operable to display the comment on the land survey.

9. The apparatus of claim 1, wherein the receiver component is operable to receive further data that is representative of at least one easement corresponding to the land survey, wherein the display component is operable to display the further data as text that includes selectable links, and wherein the display component is operable to highlight the easement in the land survey when the user selects a link corresponding to the easement in the text.

10. The apparatus of claim 1, wherein the receiver component is operable to receive further data that is representative of parking spaces depicted in the land survey, wherein the interface component is operable to receive a selection from the user of a graphical item pertaining to the parking spaces, and wherein the display component is operable to highlight the parking spaces in the land survey responsive to the interface component receiving the user selection of the graphical item.

11. The apparatus of claim 1, wherein the receiver component is operable to receive further data that is representative of zoning classifications pertaining to one or more items depicted in the land survey, wherein the interface component is operable to receive a selection from the user of a graphical item pertaining to the zoning classifications, and wherein the display component is operable to highlight at least one zoning restriction in the land survey responsive to the interface component receiving the user selection of the graphical item.

12. The apparatus of claim 1, wherein the receiver component is operable to receive further data that is representative of flood zone data pertaining the land survey, wherein the interface component is operable to receive a selection from the user of a graphical item pertaining to the flood zone data, and wherein the display component is operable to display a flood zone map to the user responsive to the interface component receiving the selection from the user of the graphical item.

13. The apparatus of claim 1, wherein the receiver component is operable to receive further data that is representative of a basis of bearing used in the land survey, wherein the interface component is operable to receive a selection from the user of a graphical item pertaining to the basis of bearing, and wherein the display component is operable to cause the basis of bearing in the land survey to be highlighted.

14. The apparatus of claim 1, wherein the receiver component is operable to receive further data that is representative of a legend corresponding to the land survey, wherein the interface component is operable to receive a selection from the user of a graphical item pertaining to the legend, and wherein the display component is operable to display certain items in the legend as being selectable to the user.

15. The apparatus of claim 1, wherein the receiver component is operable to receive further data that is multimedia data pertaining to a certain location on the land survey, wherein the interface component is operable to receive a selection from the user of a graphical item pertaining to the multimedia data, and wherein the display component is operable to cause the multimedia data to be displayed to the user responsive to the interface component receiving the selection from the user of the graphical item.

16. A method that facilitates chart analysis with respect to a land survey and a corresponding legal description of boundaries depicted in the land survey, comprising:
   a) through operation of at least one processor, receiving computer-readable data, wherein the computer-readable data comprises first data that is representative of a land survey of at least one parcel of land, wherein the computer-readable data further comprises second data that is representative of text of a legal description of the at least one parcel of land, wherein the computer-readable data further comprises third data that is representative of at least one encroachment of at least one item over a boundary line of the at least one parcel of land;
   b) through operation of the at least one processor responsive at least in part to the first data and the second data, causing a display to output a first visible representation of the land survey and a second visible representation of the text of the legal description, wherein the second visible representation includes a plurality of visually distinct portions of the text of the legal description, wherein the plurality of visually distinct portions of the text of the legal description includes respective textual descriptions of different boundary lines displayed in the first visible representation;
   c) through operation of the at least one processor, receiving through operation of at least one input device, a selection of one of the visually distinct portions of the text of the legal description, which selected visually distinct portion is one of the textual descriptions of one of the boundary lines;
   d) responsive at least in part to (c), through operation of the at least one processor, causing the display to output an altered visible representation of the land survey in which a portion of the land survey that corresponds to the selected portion of the text of the legal description in (c) is relatively more visually distinctively highlighted compared to the visible representation of the corresponding portion of the land survey prior to being altered in (d), so as to visually illustrate a correlation between the selected portion of the text of the legal description in (c) and the corresponding portion of the land survey, wherein in (d) the portion of the land survey that is relatively more visually distinctively highlighted in the altered visible representation of the land survey is a graphical depiction of the one boundary line that corresponds to the selection in (c);
   e) through operation of the at least one processor, receiving through operation of the at least one input device, a selection pertaining to the at least one encroachment;
   f) responsive at least in part to (e), through operation of the at least one processor, causing the display to output an altered visible representation of the land survey in which the at least one encroachment is relatively more visually distinctively highlighted compared to the visible representation of the corresponding portion of the land survey prior to being altered in (f).

17. Non-transitory computer readable media bearing instructions that, when executed by at least one processor, cause the at least one processor to carry out a method that facilitates chart analysis with respect to a land survey and a corresponding legal description of boundaries depicted in the land survey, comprising:
   a) through operation of the at least one processor, receiving computer-readable data, wherein the computer-readable data comprises first data that is representative of a land survey of at least one parcel of land, wherein the computer-readable data further comprises second data that is representative of text of a legal description of the at least one parcel of land, wherein the computer-readable data further comprises third data that is representative of at least one encroachment of at least one item over a boundary line of the at least one parcel of land;
   b) through operation of the at least one processor responsive at least in part to the first data and the second data, causing a display to output a first visible representation of the land survey and a second visible representation of the text of the legal description, wherein the second visible representation includes a plurality of visually distinct portions of the text of the legal description, wherein the plurality of visually distinct portions of the text of the legal description includes respective textual descriptions of different boundary lines displayed in the first visible representation;
   c) through operation of the at least one processor, receiving through operation of at least one input device, a selection of one of the visually distinct portions of the text of the legal description, which selected visually distinct portion is one of the textual descriptions of one of the boundary lines;
   d) responsive at least in part to (c), through operation of the at least one processor, causing the display to output an altered visible representation of the land survey in which a portion of the land survey that corresponds to the selected portion of the text of the legal description in (c) is relatively more visually distinctively highlighted compared to the visible representation of the corresponding portion of the land survey prior to being altered in (d), so as to visually illustrate a correlation between the selected portion of the text of the legal description in (c) and the corresponding portion of the land survey, wherein in (d) the portion of the land survey that is relatively more visually distinctively highlighted in the altered visible representation of the land survey is a graphical depiction of the one boundary line that corresponds to the selection in (c);
   e) through operation of the at least one processor, receiving through operation of the at least one input device, a selection pertaining to the at least one encroachment;
   f) responsive at least in part to (e), through operation of the at least one processor, causing the display to output an altered visible representation of the land survey in which the at least one encroachment is relatively more visually distinctively highlighted compared to the visible representation of the corresponding portion of the land survey prior to being altered in (f).

* * * * *